(12) United States Patent
Basmov et al.

(10) Patent No.: US 10,615,967 B2
(45) Date of Patent: Apr. 7, 2020

(54) RAPID DATA PROTECTION FOR STORAGE DEVICES

(71) Applicant: Microsoft Technology Licensing, LLC, Redmond, WA (US)

(72) Inventors: Innokentiy Basmov, Redmond, WA (US); Magnus Bo Gustaf Nyström, Sammamish, WA (US); Niels T. Ferguson, Redmond, WA (US); Alex M. Semenko, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/221,105

(22) Filed: Mar. 20, 2014

(65) Prior Publication Data

US 2015/0270956 A1  Sep. 24, 2015

(51) Int. Cl.
*G06F 11/30* (2006.01)
*G06F 12/14* (2006.01)
(Continued)

(52) U.S. Cl.
CPC .......... *H04L 9/0816* (2013.01); *G06F 21/602* (2013.01); *G06F 21/74* (2013.01); *G06F 21/78* (2013.01); *H04L 2209/24* (2013.01)

(58) Field of Classification Search
CPC .. G06F 21/10; G06F 21/72; G06F 2221/2107; H04L 9/08; H04L 63/0428
(Continued)

(56) References Cited

U.S. PATENT DOCUMENTS 5,495,533 A  2/1996  Linehan et al.
5,787,131 A  7/1998  Bottomley
(Continued)

FOREIGN PATENT DOCUMENTS

CN  1451117 A  10/2003
CN  1653422  8/2005
(Continued)

OTHER PUBLICATIONS

"Foreign Office Action", CN Application No. 201210314631.1, dated Dec. 1, 2014, 14 pages.
(Continued)

*Primary Examiner* — John B King
*Assistant Examiner* — Darshan I Dhruv
(74) *Attorney, Agent, or Firm* — Rainier Patents, P.S.

(57) ABSTRACT

A computing device uses a data encryption and decryption system that includes a trusted runtime and an inline cryptographic processor. The trusted runtime provides a trusted execution environment, and the inline cryptographic processor provides decryption and encryption of data in-line with storage device read and write operations. When a portion (e.g., partition) of a storage device is defined, the trusted runtime generates an encryption key and provides the encryption key to the inline cryptographic processor, which uses the encryption key to encrypt data written to the portion and decrypt data read from the portion. Access to the portion can be subsequently protected by associating the key with authentication credentials of a user or other entity. The trusted runtime protects the encryption key based on an authentication key associated with the authentication credentials, allowing subsequent access to the encryption key only in response to the proper authentication credentials being provided.

20 Claims, 9 Drawing Sheets

(51) Int. Cl.
  *H04L 9/08* (2006.01)
  *G06F 21/74* (2013.01)
  *G06F 21/78* (2013.01)
  *G06F 21/60* (2013.01)

(58) Field of Classification Search
  USPC .................................................... 713/189
  See application file for complete search history.

(56) References Cited

U.S. PATENT DOCUMENTS

| | | | |
|---|---|---|---|
| 5,897,661 A | 4/1999 | Baranovsky et al. | |
| 5,944,783 A | 8/1999 | Nieten | |
| 5,966,263 A | 10/1999 | Freitas et al. | |
| 5,974,503 A | 10/1999 | Venkatesh et al. | |
| 6,016,402 A | 1/2000 | Thomas et al. | |
| 6,028,725 A | 2/2000 | Blumenau | |
| 6,041,386 A | 3/2000 | Bello | |
| 6,067,199 A | 5/2000 | Blumenau | |
| 6,076,143 A | 6/2000 | Blumenau | |
| 6,134,062 A | 10/2000 | Blumenau | |
| 6,151,665 A | 11/2000 | Blumenau | |
| 6,170,037 B1 | 1/2001 | Blumenau | |
| 6,170,055 B1 | 1/2001 | Meyer et al. | |
| 6,253,300 B1 | 6/2001 | Lawrence et al. | |
| 6,292,317 B1 | 9/2001 | Alexander | |
| 6,292,790 B1 | 9/2001 | Krahn et al. | |
| 6,550,011 B1 | 4/2003 | Sims, III | |
| 6,665,784 B2 | 12/2003 | Ihde et al. | |
| 6,727,896 B2 | 4/2004 | Tsang | |
| 6,728,379 B1 | 4/2004 | Ishibashi et al. | |
| 6,789,162 B1 | 9/2004 | Talagala et al. | |
| 6,944,742 B1 | 9/2005 | Shoff et al. | |
| 6,968,973 B2 | 11/2005 | Uyttendaele et al. | |
| 6,996,696 B2 | 2/2006 | Shoff et al. | |
| 7,197,638 B1 | 3/2007 | Grawrock et al. | |
| 7,356,662 B2 | 4/2008 | Shoff et al. | |
| 7,360,073 B1 | 4/2008 | Billstrom et al. | |
| 7,380,140 B1 | 5/2008 | Weissman et al. | |
| 7,382,883 B2 | 6/2008 | Cross et al. | |
| 7,409,623 B2 | 8/2008 | Baker et al. | |
| 7,451,484 B1 | 11/2008 | Nadalin et al. | |
| 7,536,536 B1 | 5/2009 | Joshi et al. | |
| 7,559,088 B2 | 7/2009 | Cohen et al. | |
| 7,580,950 B2 | 8/2009 | Kavuri et al. | |
| 7,594,087 B2 | 9/2009 | Zeevi et al. | |
| 7,646,380 B2 | 1/2010 | Tsang | |
| 7,694,134 B2 | 4/2010 | Witt et al. | |
| 7,711,923 B2 | 5/2010 | Rogers et al. | |
| 7,725,703 B2 | 5/2010 | Hunter et al. | |
| 7,757,100 B2 | 7/2010 | Weissman et al. | |
| 7,849,254 B2 | 12/2010 | Ash et al. | |
| 7,890,664 B1 | 2/2011 | Tao et al. | |
| 7,903,549 B2 | 3/2011 | Judge et al. | |
| 7,930,540 B2 | 4/2011 | Ahuja et al. | |
| 7,962,739 B2 | 6/2011 | Childs et al. | |
| 7,979,626 B2 | 7/2011 | Rogers | |
| 8,046,365 B2 | 10/2011 | Saito | |
| 8,046,533 B2 | 10/2011 | Kompella et al. | |
| 8,085,933 B2 | 12/2011 | Ferguson | |
| 8,214,656 B1 | 7/2012 | Plotkin et al. | |
| 8,234,477 B2 | 7/2012 | Shaath | |
| 8,249,257 B2 * | 8/2012 | Brutch et al. ............ | 380/279 |
| 8,321,688 B2 | 11/2012 | Auradkar et al. | |
| 8,341,427 B2 | 12/2012 | Auradkar et al. | |
| 8,341,430 B2 | 12/2012 | Ureche et al. | |
| 8,387,109 B2 | 2/2013 | Ureche et al. | |
| 8,411,863 B2 | 4/2013 | Ureche et al. | |
| 8,416,954 B1 * | 4/2013 | Raizen ............... | H04L 63/0428 380/277 |
| 8,417,973 B2 | 4/2013 | Cooper et al. | |
| 8,423,792 B2 * | 4/2013 | Luciani ............... | G06F 21/602 713/192 |
| 8,458,490 B2 | 6/2013 | Konetski et al. | |
| 8,527,561 B1 | 9/2013 | Moody, II et al. | |
| 8,538,919 B1 | 9/2013 | Nielsen et al. | |
| 8,549,271 B1 | 10/2013 | Joshi et al. | |
| 8,583,879 B2 | 11/2013 | Na et al. | |
| 8,588,422 B2 | 11/2013 | Beachem et al. | |
| 8,607,308 B1 * | 12/2013 | Langford ............... | G06Q 40/00 705/1.1 |
| 8,625,802 B2 | 1/2014 | Parann-Nissany | |
| 8,661,193 B1 | 2/2014 | Cobos et al. | |
| 8,667,213 B2 | 3/2014 | Rogers et al. | |
| 8,689,279 B2 | 4/2014 | Basmov et al. | |
| 8,726,343 B1 | 5/2014 | Borzycki et al. | |
| 8,726,407 B2 | 5/2014 | Etchegoyen | |
| 8,769,305 B2 | 7/2014 | Blaisdell | |
| 8,874,935 B2 | 10/2014 | Basmov et al. | |
| 8,875,304 B2 | 10/2014 | Celi, Jr. et al. | |
| 9,207,866 B2 * | 12/2015 | Boeuf ............... | G06F 12/0269 |
| 9,323,465 B2 | 4/2016 | Flynn et al. | |
| 9,369,289 B1 | 6/2016 | Harrison et al. | |
| 9,430,664 B2 | 8/2016 | Adam et al. | |
| 9,477,614 B2 | 10/2016 | Basmov et al. | |
| 9,537,656 B2 * | 1/2017 | Debout ............... | G06F 12/1408 |
| 9,740,639 B2 | 8/2017 | Basmov et al. | |
| 2001/0000265 A1 | 4/2001 | Schreiber et al. | |
| 2002/0019935 A1 | 2/2002 | Andrew et al. | |
| 2003/0081784 A1 | 5/2003 | Kallahalla et al. | |
| 2003/0084298 A1 | 5/2003 | Messerges et al. | |
| 2003/0196114 A1 | 10/2003 | Brew et al. | |
| 2003/0221095 A1 | 11/2003 | Gaunt et al. | |
| 2004/0044912 A1 | 3/2004 | Connary et al. | |
| 2004/0090811 A1 | 5/2004 | Kang | |
| 2004/0146015 A1 | 7/2004 | Cross et al. | |
| 2004/0174345 A1 | 9/2004 | Tsang | |
| 2005/0071280 A1 | 3/2005 | Irwin et al. | |
| 2005/0091661 A1 | 4/2005 | Kurien et al. | |
| 2005/0097341 A1 | 5/2005 | Francis et al. | |
| 2005/0213377 A1 | 9/2005 | Shoff et al. | |
| 2005/0262361 A1 * | 11/2005 | Thibadeau ............... | G06F 21/80 713/193 |
| 2005/0265074 A1 | 12/2005 | Shoff et al. | |
| 2005/0283730 A1 | 12/2005 | Uyttendaele et al. | |
| 2006/0101027 A1 | 5/2006 | Hotchkiss | |
| 2006/0155919 A1 | 7/2006 | Lasser et al. | |
| 2006/0190984 A1 | 8/2006 | Heard et al. | |
| 2006/0206507 A1 | 9/2006 | Dahbour | |
| 2006/0277590 A1 | 12/2006 | Limont et al. | |
| 2006/0279556 A1 | 12/2006 | Tsang | |
| 2007/0028231 A1 | 2/2007 | Kelso et al. | |
| 2007/0058806 A1 | 3/2007 | Ferguson | |
| 2007/0150886 A1 | 6/2007 | Shapiro | |
| 2007/0244940 A1 | 10/2007 | Devarakonda et al. | |
| 2007/0250678 A1 | 10/2007 | Ueoka et al. | |
| 2007/0300008 A1 | 12/2007 | Rogers et al. | |
| 2007/0300037 A1 | 12/2007 | Rogers et al. | |
| 2008/0002830 A1 | 1/2008 | Cherkasov et al. | |
| 2008/0005467 A1 | 1/2008 | Morley et al. | |
| 2008/0010468 A1 | 1/2008 | Ruiz | |
| 2008/0082448 A1 | 4/2008 | Meijer et al. | |
| 2008/0082836 A1 * | 4/2008 | Osaki ............... | G06F 21/62 713/193 |
| 2008/0083036 A1 | 4/2008 | Ozzie et al. | |
| 2008/0107262 A1 * | 5/2008 | Helfman ............... | G06F 21/62 380/44 |
| 2008/0130156 A1 | 6/2008 | Chu et al. | |
| 2008/0141040 A1 | 6/2008 | Biddle et al. | |
| 2008/0155316 A1 | 6/2008 | Pawar et al. | |
| 2008/0168315 A1 | 7/2008 | Mead et al. | |
| 2008/0229114 A1 * | 9/2008 | Okabe ............... | G06F 21/57 713/189 |
| 2008/0229428 A1 | 9/2008 | Camiel | |
| 2008/0240253 A1 | 10/2008 | Au et al. | |
| 2008/0240441 A1 | 10/2008 | Kawakami | |
| 2008/0263371 A1 | 10/2008 | Weissman et al. | |
| 2008/0301470 A1 | 12/2008 | Green et al. | |
| 2009/0024795 A1 | 1/2009 | Kobara | |
| 2009/0063756 A1 | 3/2009 | Asipov | |
| 2009/0075630 A1 | 3/2009 | McLean | |
| 2009/0132474 A1 | 5/2009 | Ma et al. | |
| 2009/0196417 A1 * | 8/2009 | Beaver ............... | G06F 21/80 380/45 |

(56) References Cited

U.S. PATENT DOCUMENTS

| | | |
|---|---|---|
| 2009/0205012 A1 | 8/2009 | Jain et al. |
| 2009/0210267 A1 | 8/2009 | Fish et al. |
| 2009/0287874 A1 | 11/2009 | Rogers et al. |
| 2009/0307563 A1 | 12/2009 | Marquez et al. |
| 2010/0082898 A1 | 4/2010 | Mangold et al. |
| 2010/0100721 A1 | 4/2010 | Su et al. |
| 2010/0107213 A1 | 4/2010 | Ureche |
| 2010/0169948 A1 | 7/2010 | Budko et al. |
| 2010/0250847 A1 | 9/2010 | Chen |
| 2010/0266132 A1 | 10/2010 | Bablani et al. |
| 2010/0299152 A1 | 11/2010 | Batchu et al. |
| 2010/0306175 A1 | 12/2010 | Johnson et al. |
| 2010/0332725 A1 | 12/2010 | Post et al. |
| 2011/0010560 A1 | 1/2011 | Etchegoyen |
| 2011/0035577 A1* | 2/2011 | Lin .................... H04L 63/0428 713/150 |
| 2011/0055559 A1 | 3/2011 | Li et al. |
| 2011/0055560 A1* | 3/2011 | Meissner ............. G06F 21/602 713/166 |
| 2011/0060915 A1 | 3/2011 | Tal |
| 2011/0078760 A1 | 3/2011 | De Perthuis |
| 2011/0087890 A1 | 4/2011 | Munsil et al. |
| 2011/0154023 A1* | 6/2011 | Smith .................... G06F 21/78 713/155 |
| 2011/0202916 A1 | 8/2011 | VoBa et al. |
| 2011/0225431 A1 | 9/2011 | Stufflebeam, Jr. et al. |
| 2011/0225640 A1 | 9/2011 | Ganapathy et al. |
| 2011/0246785 A1* | 10/2011 | Linsley ................ G06F 21/53 713/189 |
| 2011/0247047 A1 | 10/2011 | Loureiro et al. |
| 2011/0252232 A1 | 10/2011 | De Atley et al. |
| 2011/0264925 A1 | 10/2011 | Russo et al. |
| 2011/0276683 A1 | 11/2011 | Goldschlag et al. |
| 2011/0277013 A1 | 11/2011 | Chinta |
| 2012/0017095 A1* | 1/2012 | Blenkhorn ............ G06F 21/602 713/189 |
| 2012/0036347 A1* | 2/2012 | Swanson ............... G06F 21/572 713/2 |
| 2012/0036370 A1 | 2/2012 | Lim et al. |
| 2012/0079603 A1 | 3/2012 | Brown et al. |
| 2012/0084574 A1* | 4/2012 | Nakanishi ............. G06F 21/602 713/193 |
| 2012/0087033 A1 | 4/2012 | Yang |
| 2012/0110345 A1 | 5/2012 | Pigeon et al. |
| 2012/0131336 A1* | 5/2012 | Price ...................... G06F 21/78 713/165 |
| 2012/0159148 A1 | 6/2012 | Behren et al. |
| 2012/0173882 A1 | 7/2012 | Horn et al. |
| 2012/0239618 A1 | 9/2012 | Kung |
| 2012/0297190 A1 | 11/2012 | Shen et al. |
| 2012/0331550 A1 | 12/2012 | Raj et al. |
| 2013/0013856 A1 | 1/2013 | Rogers et al. |
| 2013/0054977 A1 | 2/2013 | Basmov |
| 2013/0054979 A1* | 2/2013 | Basmov ................ G06F 3/0673 713/193 |
| 2013/0061035 A1 | 3/2013 | Hook et al. |
| 2013/0067242 A1* | 3/2013 | Lyakhovitskiy ........ G06F 21/00 713/193 |
| 2013/0074142 A1 | 3/2013 | Brennan et al. |
| 2013/0086691 A1 | 4/2013 | Fielder |
| 2013/0117561 A1 | 5/2013 | Chawla et al. |
| 2013/0117805 A1 | 5/2013 | Kent et al. |
| 2013/0124859 A1 | 5/2013 | Pestoni et al. |
| 2013/0138971 A1 | 5/2013 | Budko et al. |
| 2013/0198474 A1 | 8/2013 | Shaath |
| 2013/0208893 A1 | 8/2013 | Shablygin et al. |
| 2013/0283392 A1 | 10/2013 | Mirashrafi et al. |
| 2013/0291055 A1 | 10/2013 | Muppidi et al. |
| 2013/0318359 A1 | 11/2013 | Morris et al. |
| 2014/0007182 A1 | 1/2014 | Qureshi et al. |
| 2014/0007222 A1 | 1/2014 | Qureshi et al. |
| 2014/0019753 A1 | 1/2014 | Lowry et al. |
| 2014/0032691 A1 | 1/2014 | Barton et al. |
| 2014/0032759 A1 | 1/2014 | Barton et al. |
| 2014/0032933 A1* | 1/2014 | Smith .................. G06F 21/6209 713/193 |
| 2014/0041046 A1 | 2/2014 | Vantalon et al. |
| 2014/0059690 A1 | 2/2014 | Li et al. |
| 2014/0075493 A1 | 3/2014 | Krishnan et al. |
| 2014/0081980 A1 | 3/2014 | Aad |
| 2014/0109178 A1 | 4/2014 | Barton et al. |
| 2014/0156705 A1 | 6/2014 | Beecham et al. |
| 2014/0156706 A1 | 6/2014 | Beecham et al. |
| 2014/0164774 A1 | 6/2014 | Nord et al. |
| 2014/0181512 A1 | 6/2014 | Spalka et al. |
| 2014/0230007 A1* | 8/2014 | Roth .................... G06F 21/6209 726/1 |
| 2014/0259117 A1 | 9/2014 | Wachendorf et al. |
| 2014/0344570 A1 | 11/2014 | Adam et al. |
| 2014/0344571 A1 | 11/2014 | Adam et al. |
| 2015/0033039 A1 | 1/2015 | Basmov et al. |
| 2015/0160879 A1 | 6/2015 | Flynn et al. |
| 2015/0186657 A1 | 7/2015 | Nakhjiri |
| 2015/0278531 A1 | 10/2015 | Smith et al. |
| 2016/0072796 A1 | 3/2016 | Adam et al. |
| 2016/0080149 A1 | 3/2016 | Mehta et al. |
| 2016/0127327 A1 | 5/2016 | Mehta |
| 2016/0154744 A1 | 6/2016 | Zheng et al. |
| 2016/0173281 A1 | 6/2016 | White et al. |
| 2016/0255076 A1 | 9/2016 | Harrison et al. |
| 2016/0283406 A1 | 9/2016 | Linga et al. |
| 2017/0004094 A1 | 1/2017 | Basmov et al. |
| 2017/0005809 A1 | 1/2017 | Adam et al. |
| 2017/0104768 A1 | 4/2017 | Semenko et al. |

FOREIGN PATENT DOCUMENTS

| | | |
|---|---|---|
| CN | 1713756 | 12/2005 |
| CN | 102646077 | 8/2012 |
| CN | 102884535 A | 1/2013 |
| CN | 102945355 A | 2/2013 |
| CN | 103092664 | 5/2013 |
| CN | 103092938 | 5/2013 |
| CN | 103500116 | 1/2014 |
| CN | 103577567 | 2/2014 |
| EP | 2393033 | 12/2011 |
| EP | 2448303 | 5/2012 |
| EP | 2509275 | 10/2012 |
| EP | 2562675 | 2/2013 |
| EP | 2680487 | 1/2014 |
| TW | 200519595 | 6/2005 |
| TW | 200723093 | 6/2007 |
| TW | 201032559 | 9/2010 |
| TW | I540453 | 7/2016 |
| WO | WO-0049488 | 8/2000 |
| WO | WO-2004034184 | 4/2004 |
| WO | WO-2004107646 | 12/2004 |
| WO | WO-2009069043 | 6/2009 |
| WO | WO-2012016091 | 2/2012 |
| WO | WO-2012167392 | 12/2012 |
| WO | 2013026662 A1 | 2/2013 |

OTHER PUBLICATIONS

"Foreign Office Action", CN Application No. 201210314748.X, dated Sep. 23, 2014, 14 Pages.

"Notice of Allowance", U.S. Appl. No. 13/221,629, dated Jun. 27, 2014, 16 pages.

"BitLocker Drive Encryption in Windows Vista", Microsoft TechNet, retrieved from <http://technet.microsoft.com/en-us/library/cc725719(WS.10).aspx> on Apr. 25, 2011,Aug. 6, 2010, 9 pages.

"Final Office Action", U.S. Appl. No. 13/221,629, dated Dec. 23, 2013, 24 pages.

"International Search Report and Written Opinion", Application No. PCT/US2011/055600, dated Jul. 30, 2012, 9 pages.

"International Search Report and Written Opinion", Application No. PCT/US2011/055626, dated Sep. 19, 2012, 9 pages.

"Non-Final Office Action", U.S. Appl. No. 13/221,629, dated May 17, 2013, 27 pages.

"Non-Final Office Action", U.S. Appl. No. 13/221,699, dated Apr. 1, 2013, 16 pages.

(56) References Cited

OTHER PUBLICATIONS

"Notice of Allowance", U.S. Appl. No. 13/221,699, dated Oct. 30, 2013, 9 pages.
"Security Solutions and Services", retrieved from <http://www.csc.com/public_sector/offerings/11043/17449-security_solutions_and_services> on Apr. 25, 2011, 2 pages.
"Unlock BitLocker under Windows PC", Retrieved from: <http://windows7migration.info/index.phpoption=com_content&view=article&id=1836:unlock-bitlocker-under-windows-pe&catid=42:4sysops&Itemid=61> on Aug. 4, 2011, 5 pages.
Lawson, "Meeting Regulatory Compliance Challenges with Data Management Tools Solutions", YL & A, www.ylassoc.com, available at <ftp://public.dhe.ibm.com/software/data/db2imstools/solutions/lawson-reg-compliance.pdf>,Sep. 19, 2006, pp. 1-18.
Li, et al., "Managing Data Retention Policies at Scale", IFIP/IEEE International Symposium on Integrated Network Management 2011, Dublin, Ireland, May 23-27, 2011., available at <http://www.hpl.hp.com/techreports/2010/HPL-2010-203.pdf>,Dec. 21, 2010, 9 pages.
Mont, et al., "A Systemic Approach to Privacy Enforcement and Policy Compliance Checking in Enterprises", Trusted Systems Laboratory, HP Laboratories Bristol, HPL-2006-44, available at <http://www.hpl.hp.com/techreports/2006/HPL-2006-44.pdf>,Mar. 16, 2006, 11 pages.
Toegl, et al., "acTvSM: A Dynamic Virtualization Platform for Enforcement of Application Integrity", Lecture Notes in Computer Science vol. 6802, 2011, Retrieved from <https://online.tugraz.at/tug_online/voe_main2.getvolltext?pCurrPk=60165>,2011, 20 pages.
"Extended European Search Report", EP Application No. 11871440.1, dated Mar. 16, 2015, 5 pages.
"Extended European Search Report", EP Application No. 11871825.3, dated May 11, 2015, 7 pages.
"Foreign Office Action", CN Application No. 201210314748.X, dated Mar. 17, 2015, 7 pages.
"International Search Report and Written Opinion", Application No. PCT/US2015/049981, dated Dec. 3, 2015, 11 pages.
"International Preliminary Report on Patentability", Application No. PCT/US2013/061053, dated Nov. 24, 2015, 8 pages.
Menezes,"Handbook of Applied Cryptography", CRC Press LLC,, Jan. 1, 1997, pp. 25-27 & 551-553.
"Foreign Office Action", TW Application No. 100136564, dated Oct. 20, 2015, 11 pages.
"Final Office Action", U.S. Appl. No. 13/898,368, dated Dec. 2, 2015, 19 pages.
"Non-Final Office Action", U.S. Appl. No. 14/489,288, dated Nov. 6, 2015, 25 pages.
"About EFS (Encrypting File System)", Available at: https://www.elcomsoft.com/help/en/aefsdr/about_efs.html, Oct. 28, 2014, 3 pages.
"Adobe Air 1.5 Applications with Flex—Storing Encrypted Data", Retrieved From: <http://help.adobe.com/en_US/AIR/1.5/devappsflex/WS5b3ccc516d4fbf351e63e3d118666ade46-7e31.html> May 1, 2015, Oct. 19, 2012, 2 pages.
"Application Encryption-Vormetric Data Security Products", Available at: http://www.vormetric.com/products/vormetric-application-encryption, Jun. 27, 2014, 6 pages.
"Approaches for Encryption of Data at Rest in the Enterprise", In White Papers, 2008, 24 pages.
"Blackberry 10", Retrieved from <http://en.wikipedia.org/wiki/BlackBerry_10#BlackBerry_Balance> on Apr. 2, 2013, Apr. 1, 2013, 8 pages.
"CheckVision Enterprise Encryption", Available at: http://assets1.csc.com/banking/downloads/CardsPayments_CheckVisionEnterprise_DS.pdf, Apr. 24, 2013, 2 pages.
"DataStax Enterprise 3.2", Available at: http://docs.datastax.com/en/datastax_enterprise/3.2/datastax_enterprise/sec/secTDE.html—Retrieved on: Jul. 23, 2015, 2 pages.
"Divide: The Next Generation of Enterprise Mobility", Retrieved at <<http://www.divide.com/download/Divide_Product_Sheet_1116.pdf<< on May 8, 2013, Jan. 20, 2013, 2 pages.
"Exchange ActiveSync", Retrieved from <http://en.wikipedia.org/wiki/Exchange_ActiveSync> on Apr. 1, 2013, Apr. 1, 2013, 5 pages.

"Exchange ActiveSync: Provisioning Protocol", Retrieved from <http://msdn.microsoft.com/en-us/library/dd299443(v=EXCHG.80).aspx> on Apr. 1, 2013, Dec. 3, 2008, 4 Pages.
"Final Office Action", U.S. Appl. No. 13/898,368, dated Apr. 16, 2015, 16 pages.
"Foreign Notice of Allowance", CN Application No. 201210314631.1, dated Aug. 20, 2015, 4 pages.
"Foreign Notice of Allowance", CN Application No. 201210314748.X, dated Jul. 3, 2015, 3 pages.
"How Can We Ensure Data Security on Mobile Devices??", Retrieved From: <http://enterprise.huawei.com/topic/byod_en/solution_byod_info_3.html> Mar. 6, 2014, Jun. 16, 2013, 4 Pages.
"How Do I Prevent 'Sensitive Data Exposure'?", Retrieved From: <https://www.owasp.org/index.php/Top_10_2013-A6-Sensitive_Data_Exposure> May 12, 2015, Jun. 23, 2013, 2 pages.
"InnoSetup Help", Retrieved From: <http://www.jrsoftware.org/ishelp/index.php?topic=filessection> May 12, 2015, 8 pages.
"International Search Report and Written Opinion", Application No. PCT/US2013/061053, dated Jan. 30, 2014, 10 Pages.
"International Search Report and Written Opinion", Application No. PCT/US2015/021125, dated Jul. 3, 2015, 9 Pages.
"Mobile Device Management", Retrieved from <http://www.bing.com/search?q=mobile+device+management&src=IE-TopResult&FORM=IE1OTR> on Apr. 2, 2013, 2013, 2 pages.
"MobileIron Introduces the First Complete Mobile App Persona for the Enterprise", Retrieved from <http://www.mobileiron.com/en/company/press-room/press-releases/371-mobileiron-introduces-the-first-complete-mobile-app-persona-for-the-enterprise> on Mar. 25, 2013, Nov. 6, 2012, 2 pages.
"Non-Final Office Action", U.S. Appl. No. 13/898,368, dated Aug. 4, 2015, 17 pages.
"Non-Final Office Action", U.S. Appl. No. 13/898,368, dated Dec. 8, 2014, 12 pages.
"Non-Final Office Action", U.S. Appl. No. 13/933,928, dated Oct. 21, 2015, 11 pages.
"Non-Final Office Action", U.S. Appl. No. 14/506,167, dated Jun. 29, 2015, 16 pages.
"OMA Device Management", Retrieved from <http://en.wikipedia.org/wiki/OMA_DM> on Apr. 2, 2013, Mar. 25, 2013, 4 Pages.
"OMA Device Management", Retrieved from <http://msdn.microsoft.com/en-us/library/bb737369.aspx>, Aug. 4, 2010, 4 Pages.
"Oracle Advanced Security", Available at: http://www.oracle.com/technetwork/database/security/ds-advanced-security-tde-psft-129631.pdf, Apr. 16, 2011, 2 pages.
"Search Report", TW Application No. 100136565, dated Aug. 3, 2015, 1 page.
"Securing end-user mobile devices in the enterprise", In Proceedings: Thought Leadership White Paper, IBM Global Technology Services, Apr. 2011, 6 Pages.
"ThoriumCloud Enterprise Container", Retrieved from <http://www.thoriumcloud.com/> on Mar. 25, 2013, 2013, 4 Pages.
"Transparent Data Encryption (TDE)", Available at: https://msdn.microsoft.com/en-in/library/bb934049.aspx—Retrieved on: Jul. 23, 2015, 11 pages.
"Various Mobile Device Management (MDM) Solutions", Retrieved From: <http://www.bing.com/search?q=mobile+device+management&src=IE-TopResult&FORM=IE10TR> Mar. 5, 2014, 2 Pages.
"What Android Sync'd Data is Encrypted?", Retrieved From: <http://android.stackexchange.com/questions/3129/what-android-syncd-data-is-encrypted>, Nov. 25, 2010, 3 pages.
"Windows Selective Wipe for Device Data Management", Retrieved from <http://technet.microsoft.com/en-us/library/dn486874.aspx>, Nov. 1, 2013, 4 pages.
Adam,"Enterprise Data Protection: Building Universal Windows Apps That Keep Work and Personal Data Separate and Secure", Available at: https://mix.office.com/watch/fd0jojbqv6qx—Retrieved on: Jul. 23, 2015, 20 pages.
Becher,"Mobile Security Catching Up? Revealing the Nuts and Bolts of the Security of Mobile Devices", Proceedings of IEEE Symposium on Security and Privacy, May 22, 2011, pp. 96-111.
Bugiel,"Practical and Lightweight Domain Isolation on Android", Proceedings of the 1st ACM Workshop on Security and privacy in Smartphones and Mobile Devices, Oct. 17, 2011, 12 pages.

(56) References Cited

OTHER PUBLICATIONS

Gudeth,"Delivering Secure Applications on Commercial Mobile Devices: The Case for Bare Metal Hypervisors", Proceedings of the 1st ACM Workshop on Security and privacy in Smartphones and Mobile Devices, Oct. 17, 2011, pp. 33-38.
Kalogeropoulos,"Oracle Data Pump Encrypted Dump File Support", In Oracle White Paper, Jul. 2011, 15 pages.
Lane,"Cracking the Confusion: Encryption Layers", Available at: https://securosis.com/blog/cracking-the-confusion-encryption-layers, Feb. 12, 2015, 2 pages.
Li,"Scalable and Secure Sharing of Personal Health Records in Cloud Computing Using Attribute-Based Encryption", IEEE Transactions on Parallel and Distributed Systems, vol. 24, Issue 1, Jan. 2013, pp. 131-143.
Magnabosco,"Transparent Data Encryption", Available at: https://www.simple-talk.com/sql/database-administration/transparent-data-encryption/, Mar. 16, 2010, 19 pages.
Mitchell,"What is a Selective Wipe?", Retrieved from <http://www.landesk.com/blog/what-is-a-selective-wipe/> on Mar. 25, 2013, Apr. 30, 2012, 1 page.
Oberheide,"When Mobile is Harder Than Fixed (and Vice Versa): Demystifying Security Challenges in Mobile Environments", Proceedings of Eleventh International Workshop on Mobile Computing Systems and Applications, Feb. 22, 2010, 6 pages.
Pecherle,"Data Wiping System with Fully Automated, Hidden and Remote Destruction Capabilities", In Journal of WSEAS Transactions on Computers, vol. 9, Issue 9, Available at <http://www.wseas.us/e-library/transactions/computers/2010/88-110.pdf>, Sep. 2010, pp. 939-948.
Pisko,"Trusted Computing in Mobile Platforms—Players, Usage Scenarios, and Interests", Proceedings of Privacy and Security, Sep. 2005, pp. 526-530.
Purdy,"Thumb Drive", Retrieved From: <http://lifehacker.com/5583307/top-10-usb-thumb-drive-tricks-2010-edition> May 12, 2015, Oct. 7, 2010, 6 pages.
Reardon,"Secure Deletion on Log-structured File Systems", In Proceedings: Technical Report, Department of Computer Science, ETH Zurich Available at: <http://arxiv.org/pdf/1106.0917.pdf>, Jun. 5, 2011, 11 pages.
Stehle,"Provisioning, Policies, Remote Wipe, and the Allow/Block/Quarantine list in Exchange ActiveSync", Retrieved from <http://msdn.microsoft.com/en-us/library/exchange/hh509085(v=exchg.140).aspx> on Apr. 1, 2013, 2013, 20 pages.
Stockton,"Divide and your Data: Privacy, Sync, Backup, Restore, Storage and Wipe", Retrieved from <http://support.divide.com/entries/20964987-Divide-and-your-data-privacy-sync-backup-restore-storage-and-wipe> on Mar. 25, 2013, Feb. 8, 2012, 2 pages.
Wahl,"Oracle Advanced Security Transparent Data Encryption Best Practices", In Oracle White Paper, Jul. 2012, 29 pages.
Zeis,"The security of BlackBerry Balance", Retrieved From: <http://crackberry.com/security-blackberry-balance> Mar. 6, 2014, Aug. 2, 2013, 13 pages.
"Corrected Notice of Allowance", U.S. Appl. No. 14/506,167, dated Sep. 7, 2016, 2 pages.
"Examiner's Answer to Appeal Brief", U.S. Appl. No. 13/898,368, dated Sep. 8, 2016, 7 pages.
"Foreign Office Action", TW Application No. 105101128, dated Aug. 23, 2016, 5 pages.
"Non-Final Office Action", U.S. Appl. No. 14/481,672, dated Jul. 28, 2016, 12 pages.
"Notice of Allowance", U.S. Appl. No. 14/506,167, dated Jun. 22, 2016, 11 pages.
"Restriction Requirement", U.S. Appl. No. 14/481,672, dated Jun. 28, 2016, 6 pages.
"Second Written Opinion", Application No. PCT/US2015/049981, dated Jul. 26, 2016, 5 pages.
"Corrected Notice of Allowance", U.S. Appl. No. 14/506,167, dated Sep. 27, 2016, 2 pages.
"International Search Report and Written Opinion", Application No. PCT/US2016/039468, dated Sep. 1, 2016, 10 pages.

"Non-Final Office Action", U.S. Appl. No. 14/788,377, dated Sep. 23, 2016, 14 pages.
"Non-Final Office Action", U.S. Appl. No. 15/266,591, dated Oct. 12, 2016, 10 pages.
"Second Written Opinion", Application No. PCT/US2015/048750, dated Aug. 8, 2016, 9 pages.
"Batch File Encrypt—Encrypt and decrypt whole files or their parts using symmetric algorithms", Retrieved at: https://web.archive.org/web/20131217055640/http://www.binarymark.com/products/batchfileencrypt/default.aspx—on Dec. 15, 2016, Dec. 17, 2013, 21 pages.
"File locking—Wikipedia", Retrieved at: https://en.wikipedia.org/w/index.php?title=File_locking&oldid=679856482—on Dec. 15, 2016, 5 pages.
"International Preliminary Report on Patentability", Application No. PCT/US2015/048750, dated Dec. 6, 2016, 11 pages.
"International Preliminary Report on Patentability", Application No. PCT/US2015/049981, dated Oct. 18, 2016, 6 pages.
"International Preliminary Report on Patentability", Application No. PCT/US2015/058707, dated Oct. 27, 2016, 7 pages.
"International Search Report and Written Opinion", Application No. PCT/US2016/054036, dated Dec. 1, 2016, 12 pages.
"Second Written Opinion", Application No. PCT/US2016/039468, dated Dec. 1, 2016, 5 pages.
"Advisory Action", U.S. Appl. No. 14/506,167, dated Apr. 13, 2016, 3 pages.
"Foreign Notice of Allowance", TW Application No. 100136564, dated Feb. 25, 2016, 4 pages.
"International Search Report and Written Opinion", Application No. PCT/US2015/058707, dated Jan. 20, 2016, 11 Pages.
"International Search Report and Written Opinion", Application No. PCT/US2015/048750, dated Apr. 11, 2016, 22 pages.
"Second Written Opinion", Application No. PCT/US2015/021125, dated Feb. 2, 2016, 6 pages.
Chen,"Hardware-Assisted Application-Level Access Control", ISC '09 Proceedings of the 12th International Conference on Information Security, 090/7/2009, 16 pages.
"Final Office Action", U.S. Appl. No. 14/489,288, dated Jun. 15, 2016, 25 pages.
"Foreign Notice of Allowance", TW Application No. 100136565, dated Mar. 25, 2016, 4 pages.
"International Preliminary Report on Patentability", Application No. PCT/US2015/021125, dated May 11, 2016, 7 pages.
"Non-Final Office Action", U.S. Appl. No. 14/533,921, dated Apr. 19, 2016, 18 pages.
"Notice of Allowance", U.S. Appl. No. 13/933,928, dated Apr. 22, 2016, 8 pages.
"Final Office Action", U.S. Appl. No. 14/481,672, dated Feb. 9, 2017, 16 pages.
"Final Office Action", U.S. Appl. No. 14/506,167, dated Nov. 23, 2015, 19 pages.
"Final Office Action", U.S. Appl. No. 14/533,921, dated Feb. 24, 2017, 15 pages.
"Final Office Action", U.S. Appl. No. 14/788,377, dated May 8, 2017, 20 pages.
"Foreign Notice of Allowance", TW Application No. 110501128, dated Dec. 29, 2016, 4 pages.
"Non-Final Office Action", U.S. Appl. No. 14/489,288, dated Jan. 19, 2017, 30 pages.
"Non-Final Office Action", U.S. Appl. No. 14/879,938, dated Mar. 24, 2017, 16 pages.
"Notice of Allowance", U.S. Appl. No. 15/266,591, dated May 11, 2017, 11 pages.
Kher,"Securing Distributed Storage: Challenges, Techniques, and Systems", ACM Workshop on Storage security and survivability, 2005, p. 9-25.
Sharma,"TransCrypt: Design of a Secure and Transparent Encrypting File System", Masters Thesis, Indian Institute of Technology Kanpur, Aug. 2006, 50 pages.
"Corrected Notice of Allowance", U.S. Appl. No. 15/266,591, dated Jul. 5, 2017, 2 pages.
"Corrected Notice of Allowance", U.S. Appl. No. 15/266,591, dated Jul. 19, 2017, 2 pages.

(56) References Cited

OTHER PUBLICATIONS

"Foreign Office Action", CN Application No. 201380076761.9, dated May 31, 2017, 17 pages.
"Notice of Allowance", U.S. Appl. No. 14/481,672, dated Jul. 27, 2017, 7 pages.
"Notice of Allowance", U.S. Appl. No. 14/489,288, dated Aug. 25, 2017, 8 pages.
"Second Written Opinion", Application No. PCT/US2016/054036, dated Aug. 8, 2017, 6 pages.
"First Office Action and Search Report Issued in Chinese Patent Application No. 201580015099.5", dated Sep. 5, 2018, 17 Pages.
"Office Action Issued in European Patent Application No. 15716217.3", dated Apr. 5, 2018, 4 Pages.

* cited by examiner

RAPID DATA PROTECTION FOR STORAGE DEVICES

BACKGROUND

Computers have become increasingly commonplace and used in various different settings, which has led to situations in which users desire to have data stored on computer storage devices encrypted. These situations can be a result of a user's personal desires, a corporate policy dictating that the user's computer must encrypt corporate data stored on the personal computer's storage device, and so forth. However, waiting for an entire storage device to be encrypted (which can be on the order of several minutes or hours, depending on the size of the storage device) can be frustrating for users, leading to poor user experiences.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a method is implemented in a trusted runtime of a computing device that is isolated from other programs in the computing device. A request to generate a key for a portion of a storage device is received at the trusted runtime. In response to the request to generate the key, the key is generated and persisted using the trusted runtime across power cycles of the computing device. An inline cryptographic processor of the computing device is also provisioned with the key so that subsequent writes to the portion of the storage device are encrypted based on the key. Additionally, in response to a request that protection of the portion be enabled, an indication that protection of the portion is enabled is returned despite at least part of the portion being unencrypted.

In accordance with one or more aspects, a computing device includes an inline cryptographic processor and a trusted runtime that is isolated from an operating system of the computing device. The trusted runtime is configured to generate a key for a portion of a storage device, persist the key across power cycles of the computing device, and return, in response to a request that protection of the portion of the storage device be enabled, an indication that protection of the portion of the storage device is enabled despite one or more parts of the portion of the storage device being unencrypted. The inline cryptographic processor is configured to receive the key from the trusted runtime, encrypt subsequent writes to the portion of the storage device based on the key, and decrypt subsequent reads from the portion of the storage device based on the key.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Figure 1:
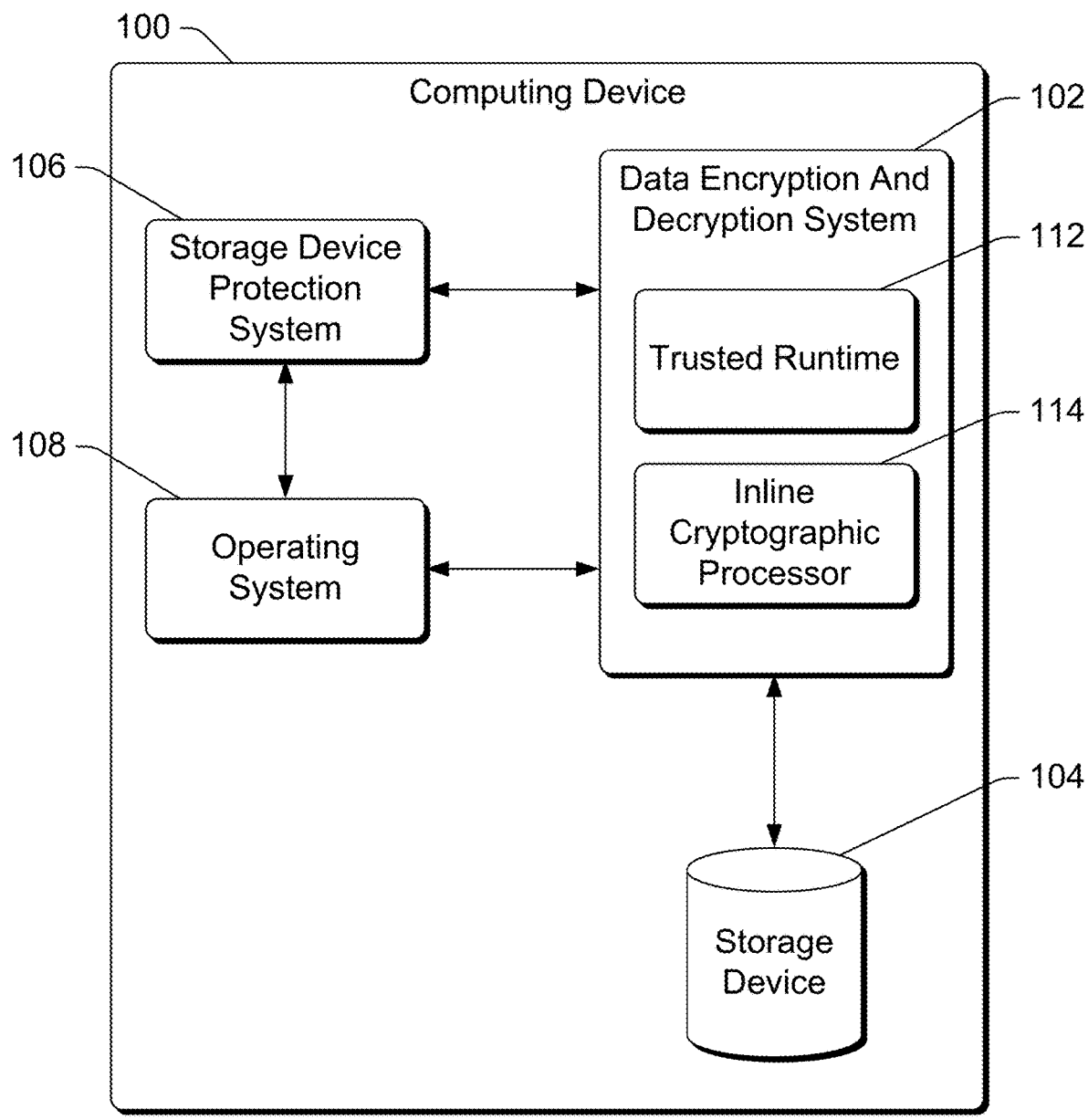
FIG. 1 is a block diagram illustrating an example computing device implementing the rapid data protection for storage devices in accordance with one or more embodiments.

Rapid data protection for storage devices is discussed herein. A computing device uses a data encryption and decryption system that includes a trusted runtime and an inline cryptographic processor. The trusted runtime provides a trusted or protected execution environment, and the inline cryptographic processor provides decryption and encryption of data in-line with storage device read and write operations. The rapid data protection discussed herein works with various portions of a storage device, such as partitions of a storage device. When a portion of a storage device is created, the trusted runtime generates an encryption key for the portion and provides the encryption key to the inline cryptographic processor. The inline cryptographic processor uses the encryption key to encrypt data written to the portion and decrypt data read from the portion, but does not persist the encryption key across power cycles of the computing device. The trusted runtime persists the encryption key securely across power cycles of the computing device, allowing the operating system to request use of the encryption key to encrypt and decrypt data stored on the portion, but not revealing the encryption key to the operating system.

Access to the portion can be subsequently protected by associating the key with particular authentication credentials. The authentication credentials of a user or other entity are provided to the trusted runtime, which protects the encryption key based on the authentication credentials (e.g., encrypts the encryption key using an authentication key of the user or other entity). The trusted runtime subsequently persists the protected encryption key. Access to the encryption key can thus subsequently be obtained by the trusted runtime only in response to the proper authentication credentials being provided, thus restricting access to the data stored on the portion to a user or entity that provides the proper authentication credentials.

Thus, upon creation of the portion, data written to the portion is encrypted and decrypted using the encryption key. This encryption and decryption occurs independently of any instruction or request from a user to have data on the portion encrypted. In response to a subsequent user request to have data on the portion encrypted, access to the encryption key is gated or restricted based on the authentication credentials of the user. Further, in response to such a user request, an indication can be rapidly returned that the data on the portion is encrypted or protected; the indication can be returned without waiting for the portion to be encrypted because any data previously written to the portion is already encrypted, and data subsequently written to the portion will also be encrypted using the encryption key. However, only a user able to provide the correct authentication credentials can authorize the inline cryptographic processor to gain access to the encryption key, and thus allow the inline cryptographic processor to subsequently decrypt data stored on the portion and encrypt data for storage on the portion.

FIG. 1 is a block diagram illustrating an example computing device 100 implementing the rapid data protection for storage devices in accordance with one or more embodiments. Computing device 100 can be a variety of different types of devices, such as a physical device or a virtual device. For example, computing device 100 can be a physical device such as a desktop computer, a server computer, a laptop or netbook computer, a tablet or notepad computer, a mobile station, an entertainment appliance, a set-top box communicatively coupled to a display device, a television or other display device, a cellular or other wireless phone, a game console, an automotive computer, and so forth. Computing device 100 can also be a virtual device, such as a virtual machine running on a physical device. A virtual machine can be run on any of a variety of different types of physical devices (e.g., any of the various types listed above). Thus, computing device 100 may range from a full resource device with substantial memory and processor resources (e.g., personal computers, game consoles) to a low-resource device with limited memory and/or processing resources (e.g., traditional set-top boxes, hand-held game consoles).

Computing device 100 includes a data encryption and decryption system 102, a storage device 104, a storage device protection system 106, and an operating system 108. The data encryption and decryption system 102 manages encryption and decryption of data written to and read from the storage device 104. The storage device 104 can be implemented using a variety of different technologies, such as a flash memory device, a magnetic disk, an optical disc, combinations thereof, and so forth. Although a single storage device 104 is illustrated in FIG. 1, it should be noted that the computing device 100 can include any number of storage devices.

The data encryption and decryption system 102 includes a trusted runtime 112 and an inline cryptographic processor 114. The trusted runtime provides a trusted or protected execution environment, and provides keys to the inline cryptographic processor 114, as discussed in more detail below. The inline cryptographic processor 114 decrypts and encrypts data in-line with device read and write operations from and to the storage device 104, as discussed in more detail below.

The storage device protection system 106 manages authentication of credentials, and configuration of the trusted runtime 112 based on the authenticated credentials (e.g., provision of an authentication key to the trusted runtime 112 based on the authenticated credentials). The operating system 108 manages the operation of various hardware devices in the computing device 100, and the running of additional programs on the computing device 100. The operating system 108, as well as other programs running on the computing device 100, can read from and write to the storage device 104 via the data encryption and decryption system 102.

The storage device 104 is illustrated as being included as part of the computing device 100. For example, the storage device 104 can be an internal storage device coupled to an internal bus of the computing device 100. By way of another example, the storage device 104 can be an internal storage device implemented as one or more chips on a same circuit board as chips implementing one or more of the systems 102, 106, and 108, can be an internal storage device implemented in the same chip as one or more of the systems 102, 106, and 108, and so forth.

The storage device 104 can alternatively be external to the computing device 100 and coupled to the computing device 100 in a variety of different wired and/or wireless manners. For example, the storage device 104 can be coupled to the computing device 100 via a Universal Serial Bus (USB) connection, a wireless USB connection, an IEEE 1394 connection, an external SATA (eSATA) connection, a Bluetooth connection, and so forth. The storage device 104 can be designed to be coupled to different computing devices (concurrently or at different times). In one or more embodiments, the storage device 104 is a removable device, such as being designed to be easily coupled to and decoupled from the computing device 100 and transported to other computing devices. An example of such a removable storage volume is a thumb drive or USB flash memory device. Alternatively, the storage device 104 can take other forms, such as being a network storage device that is coupled to computing device 100 via a network (e.g., the Internet, a local area network (LAN), a cellular or other phone network, an intranet, a storage area network (SAN), network-attached storage (NAS), a personal area network (PAN), other public and/or proprietary networks, combinations thereof, and so forth).

The storage device protection system 106 can be implemented in a variety of different manners. Although illustrated as separate from the operating system 108, the storage device protection system 106 can be implemented at least in part in the operating system 108. The storage device protection system 106 can additionally or alternatively be implemented in other manners, such as implemented as part of a pre operating system environment, as part of a pre-boot execution environment, and so forth.

Figure 2:
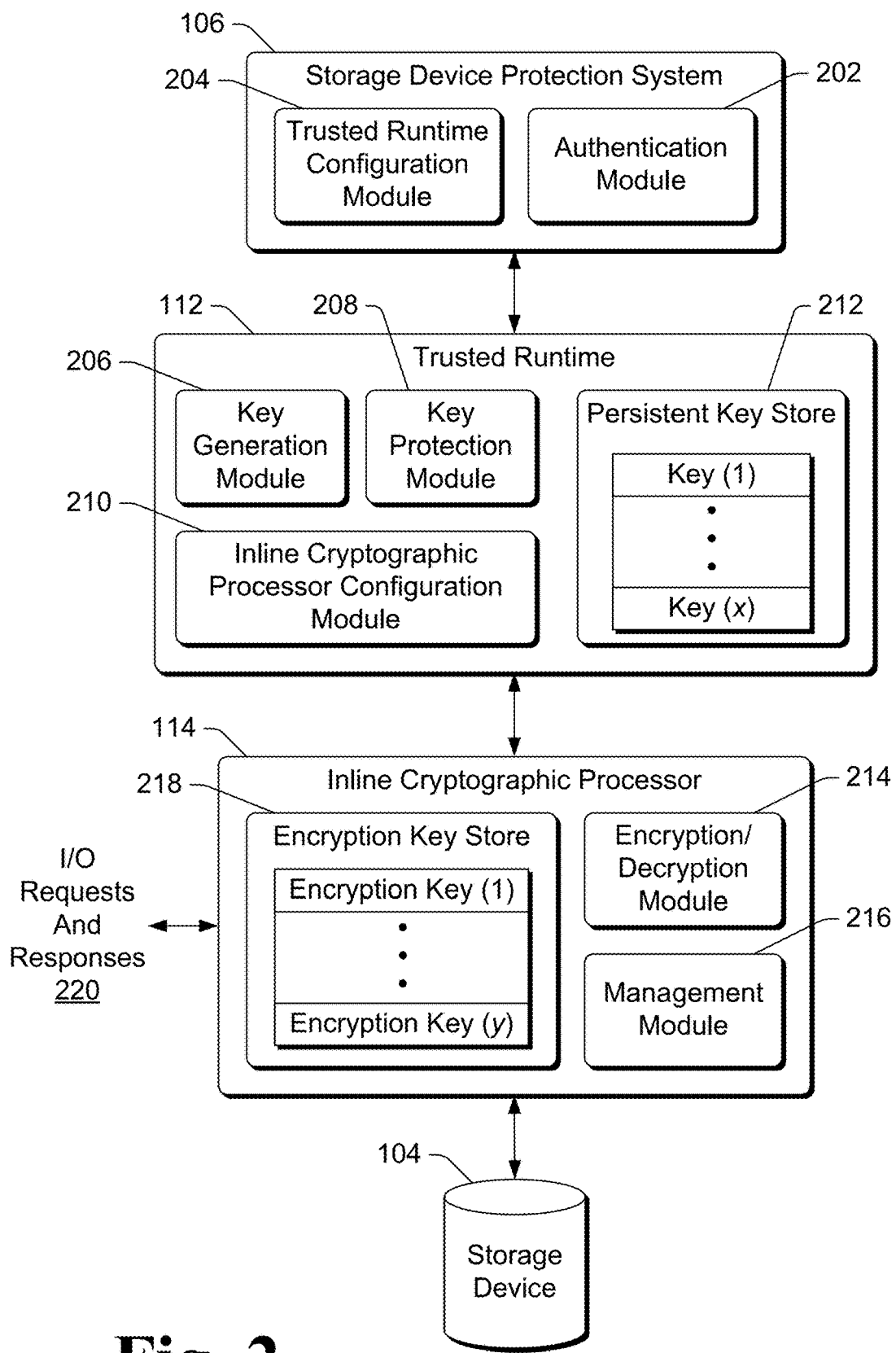
FIG. 2 illustrates an example system implementing the rapid data protection for storage devices in accordance with one or more embodiments.

FIG. 2 illustrates an example system 200 implementing the rapid data protection for storage devices in accordance with one or more embodiments. The system 200 is implemented as part of the computing device 100 of FIG. 1. The system 200 includes the storage device protection system 106, the trusted runtime 112, the inline cryptographic processor 114, and the storage device 104. The techniques discussed herein are discussed with reference to a portion of the storage device 104. A portion of the storage device 104 refers to at least a particular logical or physical part of the storage device. A portion of the storage device 104 can refer to part of the storage device 104 referred to as a partition and that is treated (e.g., displayed in folders or directories) as if it were a separate, physical storage device. However, the techniques discussed herein can be analogously applied at other granularities and used with various other portions of storage devices. For example, rather than partitions, the techniques discussed herein can be applied analogously to portions of the storage device that are files, folders or directories, entire storage devices, collections of multiple storage devices, and so forth.

The storage device protection system 106 includes an authentication module 202 and a trusted runtime configuration module 204. The trusted runtime 112 can be configured to allow the inline cryptographic processor 114 to decrypt data on the storage device 104 only if valid authentication credentials to access the data are provided, as discussed in more detail below. The authentication module 202 authenticates the authentication credentials provided by an entity and determines whether the provided authentication credentials are valid. In one or more embodiments, the entity is a user of the system 200, although the entity can alternatively be other devices, components, modules, and so forth. The storage device protection system 106 operates as a key management system, making an authentication key corresponding to valid authentication credentials available to the trusted runtime 112.

The authentication credentials can take various different forms, such as knowledge of a secret phrase (e.g., a password), a private key corresponding to a certificate, a temporal secret (e.g., a one-time password), and so forth. The authentication module 202 can maintain or otherwise obtain a record of various data to compare against the provided authentication credentials in order to determine whether the provided authentication credentials are valid, can apply any of a variety of processes or algorithms to the provided authentication credentials to determine whether the provided authentication credentials are valid, and so forth.

In response to the authentication module 202 determining that the provided authentication credentials are valid, the storage device protection system 106 obtains an authentication key associated with the entity that provided the authentication credentials. The authentication key can be obtained in various manners, such as provided by the storage device protection system 106, retrieved from a store maintained by the storage device protection system 106, received from the entity that provided the authentication credentials (e.g., from a user's smartcard), generated from the authentication credentials or other information provided by the entity that provided the authentication credentials, and so forth.

The trusted runtime configuration module 204 communicates with the trusted runtime 112 through a set of commands supported by the trusted runtime 112, providing various commands to the trusted runtime 112 to perform various operations. These operations can include, for example, enabling protection on a portion of the storage device 104, locking a protected portion of the storage device 104, unlocking a portion of the storage device 104, disabling protection of the storage device 104, and recovery and migration of keys. Some of these commands can include providing the authentication key obtained by the storage device protection system 106 to the trusted runtime 112, as discussed in more detail below.

The trusted runtime 112 includes a key generation module 206, a key protection module 208, an inline cryptographic processor configuration module 210, and a persistent key store 212. The trusted runtime 112 is an environment that allows execution of programs in the trusted runtime 112 in isolation from an operating system running on the same device. The trusted runtime isolates execution of programs in memory (preventing the operating system from accessing memory space used by the isolated programs when executing), in processor (preventing the operating system from accessing registers or other state of the processor when executing the isolated programs), and in storage (preventing the operating system or any external parties from accessing storage locations used by the isolated programs during operation as well as while the computing device is turned off). Thus, the trusted runtime 112 allows modules to execute as programs on a computing device that are isolated from and independent of the operating system and any other programs (e.g., not executing in the trusted runtime 112) executing on the computing device. The operating system or other programs executing on the computing device can only access programs in the trusted runtime using an interface (e.g., a set of interface commands) exposed by the trusted runtime 112.

The trusted runtime 112 can be implemented in a variety of different manners. In one or more embodiments, the trusted runtime 112 is implemented as an ARM TrustZone on ARM architecture processors of the computing device. Alternatively, the trusted runtime 112 can be implemented in other manners, such as by a separate processor of the computing device (e.g., a processor or processor core separate from the processor or processor core on which the operating system executes). Alternatively, the trusted runtime can be implemented by an additional secure mode provided or facilitated by a hypervisor or other virtual machine manager of the computing device.

The key generation module 206 generates encryption keys to be used to encrypt data on portions of the storage device 104. The key generation module 206 can generate encryption keys using any of a variety of public and/or proprietary techniques. In one or more embodiments, the key generation module 206 generates a different encryption key for each portion of the storage device 104, and can maintain these keys in the persistent key store 212. The keys maintained in the persistent key store 212 are maintained as associated with the respective portions of the storage device 104 for which they were generated. One or more (e.g., multiple (x)) keys can be maintained in the persistent key store 212, such as one key for each portion of the storage device 104. The persistent key store 212 can be implemented in a variety of different manners, and allows the keys in the store 212 to be persisted across power cycles of the computing device. A power cycle of the computing device refers to the computing device being powered off and then powered on again, or the computing device being rebooted or hardware reset. Thus, after the computing device implementing the system 200 has been powered off and again powered on, or after the computing device has been rebooted, the keys remain in the persistent key store 212.

The key protection module 208 protects (e.g., encrypts) the keys in the persistent key store 212 under certain circumstances, such as when protection on a portion of the storage device 104 is enabled as discussed in more detail below. The inline cryptographic processor configuration module 210 communicates with the inline cryptographic processor 114, providing encryption keys to the inline cryptographic processor 114 as discussed in more detail below.

In one or more embodiments, an operating system (e.g., operating system 108 of FIG. 1) can communicate with the trusted runtime 112 through a set of commands supported by the trusted runtime 112. These commands can allow certain operations to be performed, such as locking a protected portion of the storage device. In one or more embodiments, commands that include an authentication key being provided to the trusted runtime 112 are provided by the storage device protection system 106, whereas other commands (e.g., locking a protected portion of the storage device) that need not have an authentication key provided to the trusted runtime can be provided by the operating system 108 or the storage device protection system 106. It should be noted that, regardless of whether a command is received from the operating system 108 or from the storage device protection system 106, the trusted runtime 112 does not disclose the encryption keys generated by the key generation module 206 to the operating system 108 or the storage device protection system 106.

Alternatively, rather than maintaining protected keys in the persistent key store 212, the key protection module 208 can return the protected encryption key to the operating system. The operating system can optionally store the protected encryption key so that the protected encryption key is persisted across power cycles of the computing device. The key protection module 208 knows the key used to protect (e.g., encrypt) the encryption key and does not reveal the key to the operating system. The operating system therefore does not have access to the encryption key, but the operating system can provide the protected encryption key to the key protection module 208, which can in turn retrieve the encryption key from the protected key. Thus, the trusted runtime 112 can leverage the operating system to store one or more protected keys rather than (or alternatively in addition to) maintaining the protected keys in the persistent key store 212.

The inline cryptographic processor 114 includes an encryption and decryption module 214, a management module 216, and an encryption key store 218. Encryption keys are received from the trusted runtime 112 and stored as encryption keys in the encryption key store 218. One or more (e.g., multiple (y)) encryption keys can be stored in the encryption key store 218. In one or more embodiments, the encryption key store 218 includes one encryption key for each portion of the storage device 104. Once stored in the encryption key store 218, an encryption key is maintained in the encryption key store 218 until a command is received (e.g., from the trusted runtime 112) to delete the encryption key, or until a power cycle occurs (e.g., the computing device is powered down, the computing device is rebooted, and so forth). Although the encryption key is not persisted in the encryption key store 218, after a power cycle occurs the trusted runtime 112 can again provide encryption keys to the inline cryptographic processor for inclusion in the encryption key store 218 (optionally only after being obtained from a protected encryption key in the persistent key store 212, as discussed in more detail below).

The inline cryptographic processor 114 receives and responds to I/O requests 220. The I/O requests 220 are from an operating system (e.g., the operating system 108 of FIG. 1), or alternatively other programs running on the computing device implementing the system 200. The encryption and decryption module 214 encrypts data received as part of an I/O request 220 prior to the data being written to a portion of the storage device 104. The encryption and decryption module 214 also decrypts data read from a portion of the storage device 104 prior to the data being returned to the requester as part of a read I/O request 220.

In embodiments in which the encryption key store 218 stores multiple encryption keys, an indication of the encryption key to be used by the inline cryptographic processor 114 to encrypt or decrypt data for an I/O request 220 can be provided as part of the I/O request 220. The indication can take various different forms, such as an identifier of an encryption key (e.g., provided by the trusted runtime when the portion is created or a portion is unlocked, as discussed in more detail below), an indication of the portion to which the request applies, and so forth. In one or more embodiments, this identifier of an encryption key is an identifier of a register of the inline cryptographic processor in which the encryption key is stored.

Alternatively, no such indication of the encryption key to be used by the inline cryptographic processor 114 need be provided. For example, the inline cryptographic processor 114 or the trusted runtime 112 can maintain a record of which encryption key is used for which portion of the storage device 104, in which case no such indication need be provided. By way of another example, if the encryption key store 218 includes a single encryption key, then no such indication need be provided.

It should be noted that although an indication of an encryption key to use to encrypt and decrypt content can be received by the inline cryptographic processor 114, and the encryption key is provided to the inline cryptographic processor 114 by the trusted runtime 112, the inline cryptographic processor 114 does not disclose the encryption keys to devices or programs external to the inline cryptographic processor 114. Under particular conditions, such as when swapping encryption keys in and out of the encryption key store 218 as discussed in more detail below, a protected version of an encryption key may be disclosed by the inline cryptographic processor 114, but other than under such particular conditions the encryption keys (protected or unprotected) are not disclosed by the inline cryptographic processor 114.

The management module 216 manages operation of the inline cryptographic processor 114, optionally including managing communications with the trusted runtime 112. In one or more embodiments, the trusted runtime 112 communicates with the management module 216 of the inline cryptographic processor 114 via another module or component, using secure (e.g., encrypted) communication channels. For example, the trusted runtime 112 can provide encryption keys to the management module 216, which stores the encryption keys in the encryption key store 218. In other embodiments, the trusted runtime 112 can communicate with the inline cryptographic processor 114 directly, such as by storing encryption keys directly in registers of the encryption key store 218. The management module 216 also manages disclosing a protected version of an encryption key under the particular conditions discussed above.

The inline cryptographic processor 114 is implemented at least in part in hardware (e.g., as one or more hardware chips), and is in-line with the regular read and write operations for the storage device 104. Thus, all data written to a portion of the storage device 104 can be encrypted by the inline cryptographic processor 114, and all data read from a portion of the storage device can be decrypted by the inline cryptographic processor 114. Generally, the inline cryptographic processor 114 is cryptographic hardware with one or more registers that can store encryption keys, and that allows an operating system or other programs to reference and use the registers (e.g., to have data encrypted), but does not allow an operating system or other programs to extract the contents of the registers.

In one or more embodiments, the inline cryptographic processor 114 is implemented as part of a storage controller for the storage device 104. Alternatively, the inline cryptographic processor 114 can be implemented in other manners, such as in a video path (e.g., a video card or other hardware) for video recording or playback, an audio path (e.g., an audio card or other hardware) for audio recording or playback, in a communications path (e.g., a network card or other hardware) for sending or receiving data to another device, and so forth.

The encryption and decryption module 214 can encrypt and decrypt data based on an encryption key in the encryption key store 218 using any of a variety of public and/or proprietary techniques. In one or more embodiments, the encryption and decryption module 214 uses symmetric key cryptography, with the same key (the encryption key) being used for encryption and decryption. Alternatively, the encryption and decryption module 214 can use asymmetric key cryptography, with different keys being used for encryption and decryption. In such embodiments, although only the encryption key is illustrated in the encryption key store 218, the key generation module 206 generates both the encryption key and the decryption key, and the encryption key store 218 maintains both the encryption key and the decryption key. The encryption and decryption module 214 thus uses the encryption key from the store 218 when encrypting data to be written to a portion of the storage device 104, and uses the decryption key from the store 218 when decrypting data read from a portion of the storage device 104. Thus, it should be noted that in discussions herein referring to decryption using the encryption key, such references are to a separate decryption key in situations where asymmetric key cryptography is being used.

In one or more embodiments, the encryption key store 218 can store up to a particular number (y) of encryption keys, although the storage device 104 may include more than that particular number of portions. In such situations, encryption keys are swapped in and out of the encryption key store 218 as appropriate so that the encryption key identified by an I/O request 220 is included in the encryption key store 218. The swapping of encryption keys can be implemented in various manners. For example, if an encryption key identified by an I/O request 220 is not included in the encryption key store 218, the management module 216 can request and receive the identified encryption key from the trusted runtime 112.

By way of another example, the management module 216 can have an encryption key protected (e.g., encrypted using a secret key known only to the inline cryptographic processor 114) and the protected encryption key returned to the operating system. If an encryption key identified by an I/O request 220 is not included in the encryption key store 218, the management module 216 can request and receive a protected version of the identified encryption key from the operating system, then decrypt and store the encryption key in the encryption key store 218. Thus, the operating system itself can participate in the swapping of encryption keys. In such situations, the management module 216 can optionally change the secret key used to protect the encryption key after a particular amount of time elapses or in response to a particular event (e.g., the computing device is powered down or rebooted). Thus, after the particular amount of time elapses or the particular event occurs, the protected key maintained by the operating system is no longer usable by the inline cryptographic processor 114 because the key has changed.

The use of the trusted runtime 112 and the inline cryptographic processor 114 allows the system 200 to generate a different key for each portion created on the storage device 104, and encrypt/decrypt all data stored in the portion as the data is written/read. While portions can be created very early in the lifetime of the storage device 104, and the storage device 104 can be handled by potentially untrusted parties, the portion encryption key is never exposed to such parties even if they have physical access to the storage device 104 and/or have administrative privileges on the operating system installed on the computing device implementing the system 200.

The system 200 supports various different operations, as mentioned above. These operations include, for example, generating an encryption key for a newly defined portion of the storage device 104, enabling protection on a portion of the storage device 104, locking a protected portion of the storage device 104, unlocking a portion of the storage device 104, disabling protection of the storage device 104, and recovery and migration of keys. These operations are discussed in additional detail as follows.

Generating Encryption Keys for Newly Created Portions

Portion creation refers to the creation or definition of a new portion of the storage device 104. One or more portions can be created on the storage device 104. These portions can be created in response to a request from a user of the computing device, an administrator of the computing device, another device or module, and so forth. The creation of a portion includes various acts, including establishing and maintaining various data structures describing the portion, such as which parts of the storage device (e.g., which sectors of a disk) are included in the portion. The portion can be created using any of a variety of public and/or proprietary techniques. Additionally, as part of the creation of the portion, the trusted runtime is requested to generate an encryption for the newly created (also referred to as newly defined) portion.

Figure 3:
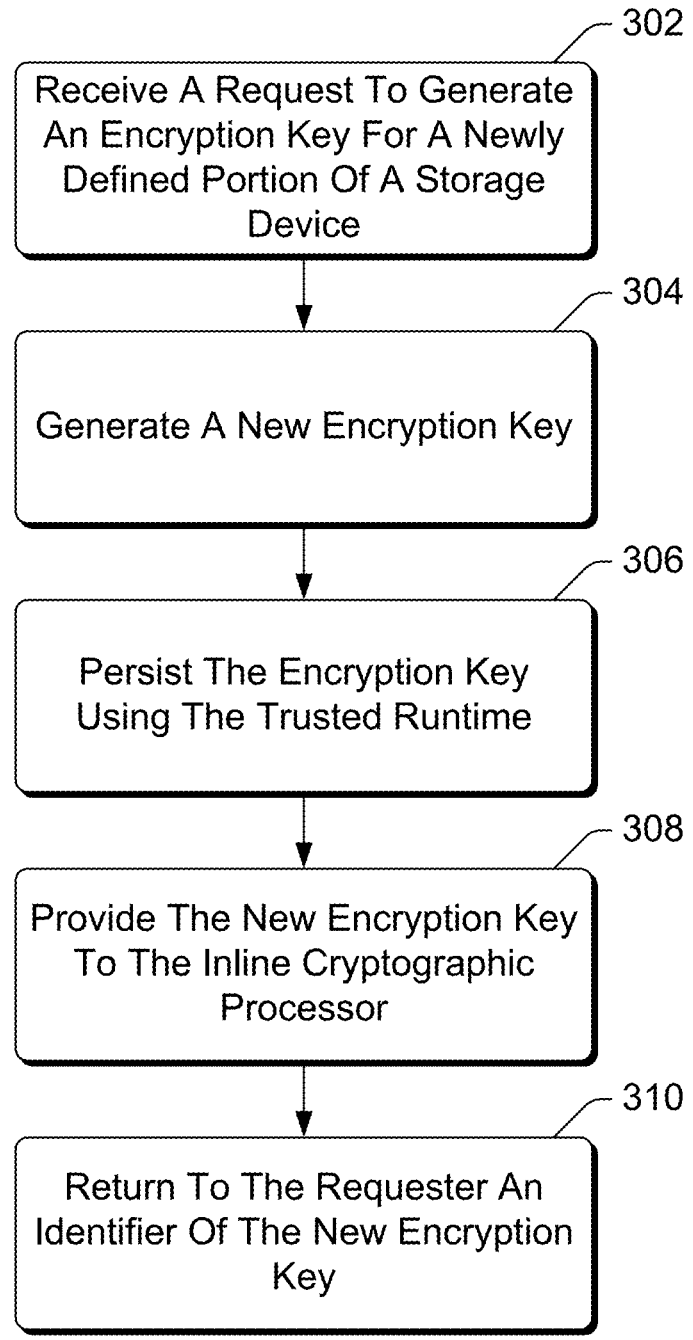
FIG. 3 is a flowchart illustrating an example process for generating an encryption key for a newly defined portion of a storage device in accordance with one or more embodiments.

FIG. 3 is a flowchart illustrating an example process 300 for generating an encryption key for a newly defined portion of a storage device in accordance with one or more embodiments. Process 300 is carried out by a trusted runtime of a computing device, such as trusted runtime 112 of FIGS. 1 and 2, and can be implemented in software, firmware, hardware, or combinations thereof. Process 300 is shown as a set of acts and is not limited to the order shown for performing the operations of the various acts. Process 300 is an example process for generating an encryption key for a newly defined portion of a storage device; additional discussions of generating an encryption key for a newly defined portion of a storage device are included herein with reference to different figures.

In process 300, a request to generate an encryption key for a newly defined portion of a storage device is received (act 302). The request can be received in the form of a command, and can be received from various different modules. For example, the request can be received from the operating system 108 of FIG. 1, the storage device protection system 106 of FIG. 1 or FIG. 2, and so forth. The request can be received, for example, from a program or module creating or defining the newly defined portion of the storage device. This portion can be created or defined in any of a variety of manners using various public and/or proprietary techniques.

In response to the received request, a new encryption key is generated (act 304). The new encryption key can be generated in any of a variety of manners, as discussed above.

Additionally, the newly generated encryption key is persisted using the trusted runtime (act 306). The newly generated encryption key can be persisted in different manners. In one or more embodiments, the newly generated encryption key is maintained in a persistent key store of the trusted runtime. Alternatively, the encryption key can be persisted in other manners. For example, an encrypted encryption key can be generated (e.g., generated by encrypting the encryption key using a secret key known only to the trusted runtime) and the encrypted encryption key provided to the operating system. The operating system can thus maintain the encrypted encryption key, relieving the trusted runtime of the need to maintain the encryption key.

Regardless of how the newly generated encryption key is persisted, the encryption key is persisted across power cycles. For example, the persistent key store of the trusted runtime can persist the encryption key across power cycles as discussed above. By way of another example, the operating system can manage storage of the encrypted encryption key in a nonvolatile memory that persists the encrypted encryption key across power cycles.

The newly generated encryption key is also provided to the inline cryptographic processor (act 308). Providing the newly generated encryption key to the inline cryptographic processor provisions the inline cryptographic processor with the newly generated encryption key, allowing the inline cryptographic processor to encrypt data written to the portion and decrypt data read from the portion based on the newly generated encryption key. The manner in which the encryption key is used to encrypt and decrypt data varies based on the manner in which encryption and decryption is performed by the inline cryptographic processor.

An identifier of the newly generated encryption key is returned to the requester (act 310). The identifier can take any of a variety of different forms, but allows different encryption keys (e.g., used for different portions) to be identified. Thus, if the inline cryptographic processor is storing multiple encryption keys, one for each of multiple portions of a storage device, the correct encryption key for a particular portion can be identified. For example, the operating system can issue read and write requests that include an identifier of the particular encryption key to use. It should be noted that this identifier of an encryption key merely allows the operating system to identify to the inline cryptographic processor which encryption key to use; the identifier does not provide or otherwise allow the operating system to obtain the encryption key.

Thus, all data written to the portion is encrypted by the inline cryptographic processor, and all data read from the portion is decrypted by the inline cryptographic processor. No component, module, or device other than the trusted runtime and the inline cryptographic processor have or can gain access to the newly generated encryption key, and neither the trusted runtime nor the inline cryptographic processor will reveal the encryption key to any component, module, or device external to the trusted runtime and the inline cryptographic processor as discussed above.

It should be noted that after creation of the portion, access to the data stored in the portion is unrestricted. Although the data stored in the portion is encrypted, no authentication credentials need be provided to the trusted runtime in order to read the encrypted data.

The process 300 can be repeated any number of times to create new portions on the storage device.

Enabling Protection on a Portion

Enabling protection on a portion refers to associating the portion with particular authentication credentials, allowing only authenticated entities to access the portion. For example, a user can request to have the portion protected, and as a result have the portion associated with the authentication credentials of the user, allowing access to the data stored on the portion (and allowing new data to be stored on the portion) only if the authentication credentials of the user are provided.

Figure 4:
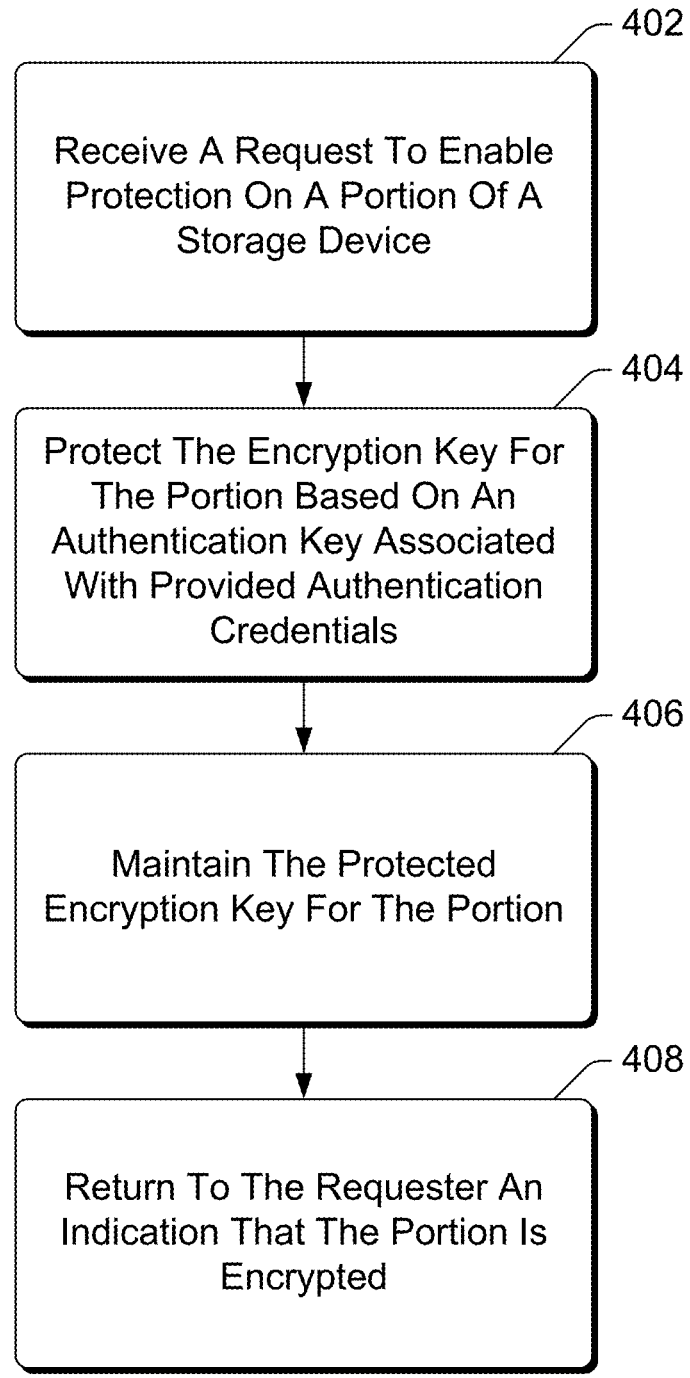
FIG. 4 is a flowchart illustrating an example process for enabling protection on a portion of a storage device in accordance with one or more embodiments.

FIG. 4 is a flowchart illustrating an example process 400 for enabling protection on a portion of a storage device in accordance with one or more embodiments. Process 400 is carried out by a trusted runtime of a computing device, such as trusted runtime 112 of FIGS. 1 and 2, and can be implemented in software, firmware, hardware, or combinations thereof. Process 400 is shown as a set of acts and is not limited to the order shown for performing the operations of the various acts. Process 400 is an example process for enabling protection on a portion of a storage device; additional discussions of enabling protection on a portion of a storage device are included herein with reference to different figures.

In process 400, a request to enable protection on a portion of a storage device is received (act 402). This request is also referred to as a request to encrypt the portion of the storage device. The request can be received in the form of a command, and can be received from various different modules. In one or more embodiments, the request is received from the storage device protection system 106 of FIG. 1 or FIG. 2, although the request can alternatively be received from other modules such as the operating system 108 of FIG. 1.

In response to the request, the encryption key for the portion is protected based on an authentication key (act 404). The authentication key is the authentication key associated with user credentials provided to the storage device protection system 106. In one or more embodiments, the authentication key is the authentication key associated with an entity (e.g., a user) currently logged into a computing device implementing the system 200 of FIG. 2 at the time the request is received in act 402. Alternatively, the authentication key can be the authentication key associated with another entity providing user credentials to the computing device implementing the system 200 of FIG. 2.

The encryption key can be protected based on the authentication key (also referred to as wrapping the encryption key with the authentication key) in various manners. In one or more embodiments, an encryption algorithm uses the authentication key as the key to encrypt the encryption key. Any of a variety of public and/or proprietary encryption algorithms can be used to encrypt the encryption key. Once encrypted, the encryption key can be retrieved (decrypted) using the authentication key and an appropriate decryption algorithm, but cannot be retrieved (or it is computationally very difficult to be retrieved) without the authentication key.

The authentication key to use to protect the encryption key can be obtained by the trusted runtime in a variety of different manners. In one or more embodiments, the authentication key is provided by the storage device protection system 106 as part of the request in act 402. Alternatively, the authentication key can be provided by the storage device protection system 106, or alternatively another module or device, in other manners or at other times.

The protected encryption key for the portion is maintained (act 406). The protected encryption key for the portion can be maintained in different manners. In one or more embodiments, the protected encryption key is maintained in the persistent key store of the trusted runtime. The encryption key for the portion in the persistent key store of the trusted runtime is replaced with the protected encryption key for the portion, so the trusted runtime no longer maintains the encryption key in the clear—the unprotected encryption key is removed and only the protected encryption key is maintained. Thus, without being provided the authentication key, the trusted runtime can no longer determine the encryption key for the portion of the storage device. Alternatively, the protected encryption key can be maintained in other manners. For example, the protected encryption key can be provided to the operating system, and the encryption key removed (e.g., deleted) from the persistent key store. Thus, without being provided the authentication key, the trusted runtime can no longer determine the encryption key for the portion of the storage device.

The trusted runtime also has the protected encryption key persisted across power cycles of the computing device. The trusted runtime can have the protected encryption key persisted across power cycles of the computing device in different manners, such as by storing the protected encryption key in the persistent key store of the trusted runtime, or by providing the protected encryption key to the operating system.

An indication that the portion is protected is also returned to the requester (act 408). This indication can also be referred to as an indication that the portion is encrypted. The indication can be returned rapidly to the requester—the trusted runtime need not wait for data already written to the portion to be encrypted before returning the indication because all data written to the portion is encrypted by the inline cryptographic processor. Although parts of the portion may not yet be encrypted, those unencrypted parts are parts to which no data has been written yet (if data had been written to those parts, it would have been encrypted by the inline cryptographic processor).

After protection is enabled on the portion, the authentication key is needed in order for the trusted runtime to derive the encryption key and provide the encryption key to the inline cryptographic processor. The encryption key is no longer available to the trusted runtime other than via the protected encryption key (e.g., the encryption key has been replaced in the trusted runtime with the protected encryption key), so the trusted runtime cannot retrieve the encryption key without the authentication key.

Locking a Protected Portion

Locking a protected portion refers to preventing access to a portion for which protection was previously enabled. For example, at some point in time after a user requests to enable protection of a portion, the user can request to have the portion locked. As a result, access to the portion is prevented, so that data stored on the portion cannot be decrypted, and new encrypted data cannot be written to the portion.

Figure 5:
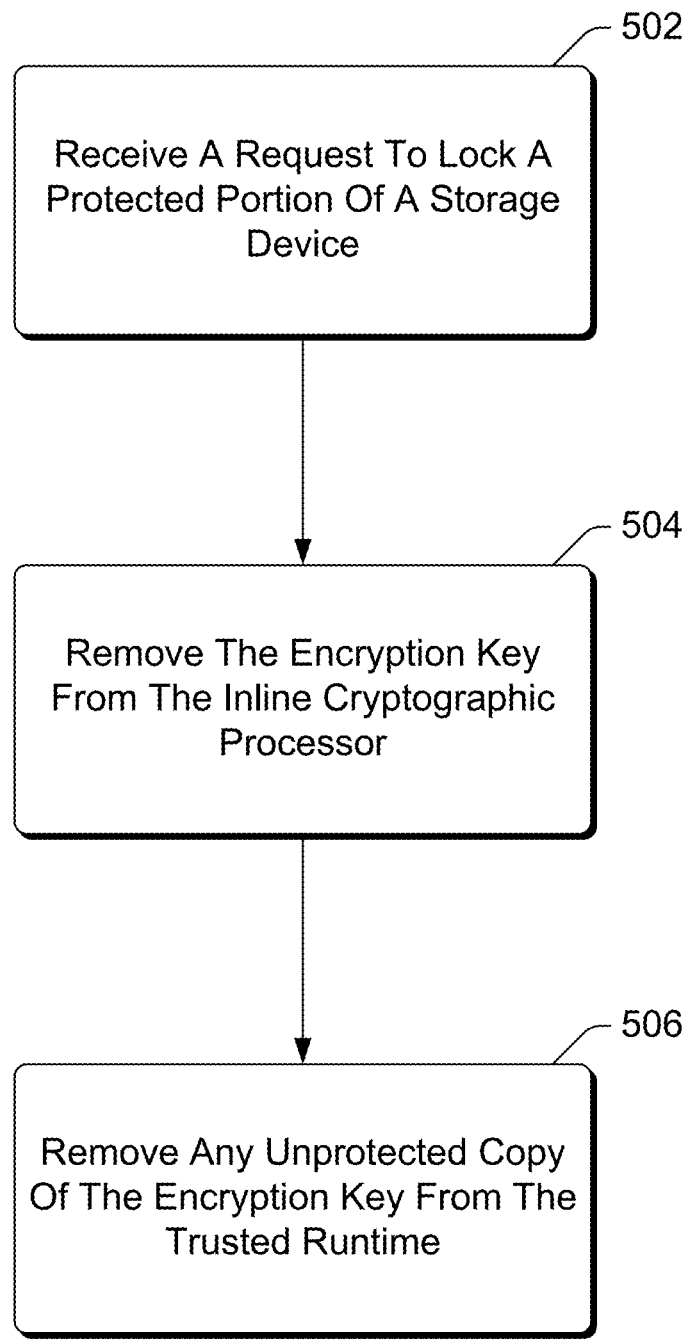
FIG. 5 is a flowchart illustrating an example process for locking a protected portion of a storage device in accordance with one or more embodiments.

FIG. 5 is a flowchart illustrating an example process 500 for locking a protected portion of a storage device in accordance with one or more embodiments. Process 500 is carried out by a trusted runtime of a computing device, such as trusted runtime 112 of FIGS. 1 and 2, and can be implemented in software, firmware, hardware, or combinations thereof. Process 500 is shown as a set of acts and is not limited to the order shown for performing the operations of the various acts. Process 500 is an example process for locking a protected portion of a storage device; additional discussions of locking a protected portion of a storage device are included herein with reference to different figures.

In process 500, a request to lock a protected portion of a storage device is received (act 502). The request can be received in the form of a command, and can be received from various different modules. In one or more embodiments, the request is received from the storage device protection system 106 of FIG. 1 or FIG. 2, although the request can alternatively be received from other modules such as the operating system 108 of FIG. 1. The request can be initiated by a user or other module, and can be an explicit request (e.g., a request that the protected portion be locked because the user desires it) or an implicit request (e.g., a request that the protected portion be locked because the user is logging off of his or her account on the computing device).

In one or more embodiments, storage device protection system 106 or the operating system 108 issues the request in act 502 as part of a process of preventing access to the portion. The storage device protection system 106 or the operating system 108 can also perform additional acts in preventing access to the portion, including stopping sending I/O requests to the portion, dismounting the portion, and so forth.

In response to the request, the encryption key is removed from the inline cryptographic processor (act 504). The encryption key can be removed from the inline cryptographic processor by the trusted runtime in various manners, such as issuing a command to the inline cryptographic processor to delete the encryption key from the encrypted key store of the inline cryptographic processor, the trusted runtime writing a new value (e.g., all zeroes, all ones, etc.) to the register of the inline cryptographic processor where the encryption key is stored, and so forth.

Additionally, any unprotected copies of the encryption key are removed from the trusted runtime (act 506). Situations can arise in which the trusted runtime, after providing an encryption key to the inline cryptographic processor, keeps a copy of the encryption key for some amount of time (e.g., for a few minutes, or longer to facilitate swapping of encryption keys in the inline cryptographic processor). If any unprotected copies of the encryption key remain in the trusted runtime, those copies are deleted in act 506. It should be noted, however, that if the protected encryption key is stored in the persistent key store, the protected encryption key in the persistent key store is not deleted.

After a protected portion is locked, neither the trusted runtime nor the inline cryptographic processor has an unprotected copy of the encryption key. The trusted runtime may have (or obtain) a protected copy of the encryption key, and the authentication key is needed in order for the trusted runtime to derive the encryption key and again provide the encryption key to the inline cryptographic processor.

Unlocking a Portion

Unlocking a protected portion refers to allowing access to a previously locked portion. For example, at some point in time after a portion is locked, the user can request to have the portion unlocked. As a result, access to the portion is again allowed so that data stored on the portion can be decrypted, and data can be encrypted and written to the portion.

Figure 6:
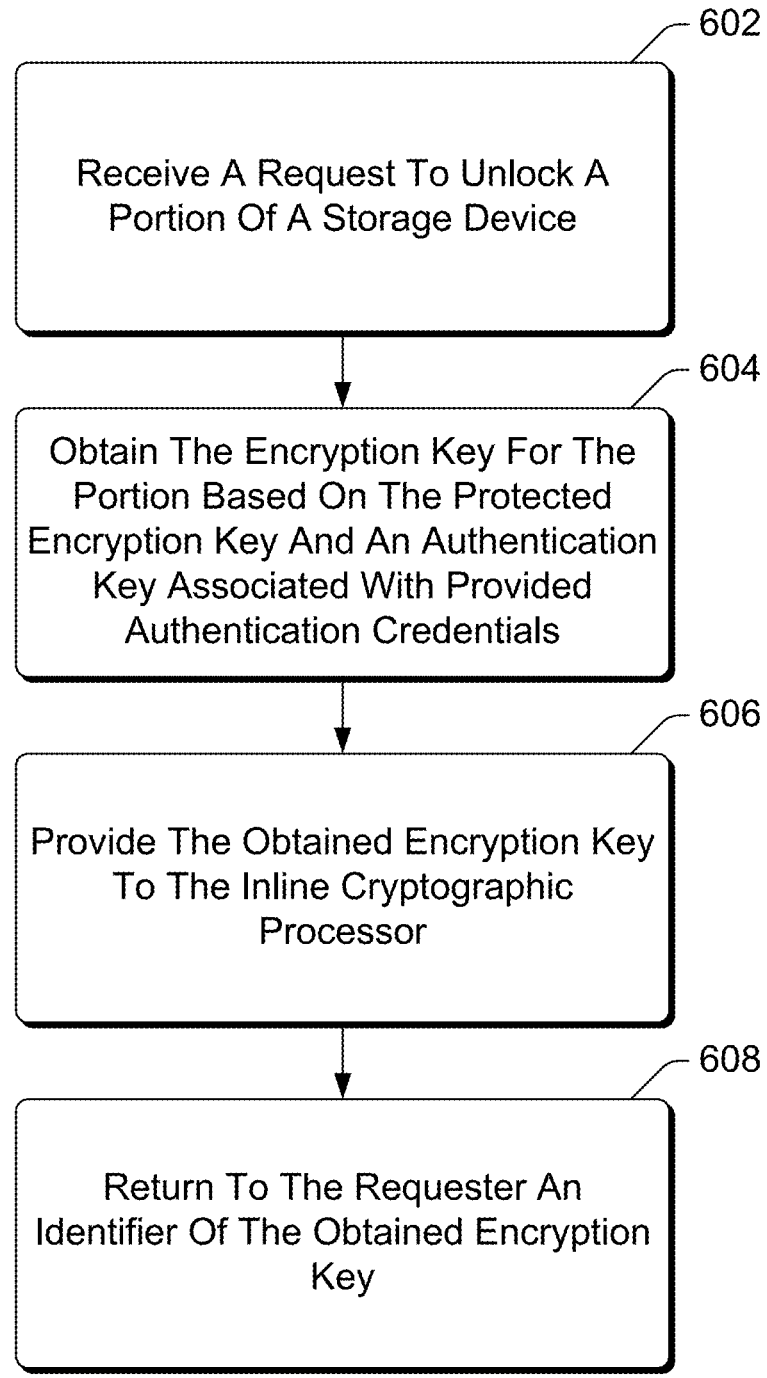
FIG. 6 is a flowchart illustrating an example process for unlocking a protected portion of a storage device in accordance with one or more embodiments.

FIG. 6 is a flowchart illustrating an example process 600 for unlocking a protected portion of a storage device in accordance with one or more embodiments. Process 600 is carried out by a trusted runtime of a computing device, such as trusted runtime 112 of FIGS. 1 and 2, and can be implemented in software, firmware, hardware, or combinations thereof. Process 600 is shown as a set of acts and is not limited to the order shown for performing the operations of the various acts. Process 600 is an example process for unlocking a protected portion of a storage device; additional discussions of unlocking a protected portion of a storage device are included herein with reference to different figures.

In process 600, a request to unlock a portion of a storage device is received (act 602). The request can be received in the form of a command, and can be received from various different modules. In one or more embodiments, the request is received from the storage device protection system 106 of FIG. 1 or FIG. 2, although the request can alternatively be received from other modules such as the operating system 108 of FIG. 1. The request can be initiated by a user or other module, and can be an explicit request (e.g., a request that the portion be unlocked because the user desires it) or an implicit request (e.g., a request that the portion be unlocked because the user is logging into his or her account on the computing device).

In response to the request, the encrypted key for the portion is obtained from the protected encryption key for the portion (act 604). The encryption key for the portion is obtained based on both the protected encryption key and an authentication key. The protected encryption key for the portion is maintained in the persistent key store, or can be received from the operating system, as discussed above. The authentication key is the authentication key associated with user credentials provided to the storage device protection system 106. In one or more embodiments, the authentication key is the authentication key associated with an entity (e.g., a user) currently logged into a computing device implementing the system 200 of FIG. 2 at the time the request is received in act 402. Alternatively, the authentication key can be the authentication key associated with another entity providing user credentials to the computing device implementing the system 200 of FIG. 2.

The encryption key can be obtained from the protected encryption key in a variety of different manners, based at least in part on the manner in which the encryption key was previously protected. In one or more embodiments, a decryption algorithm uses the authentication key as the key to decrypt the encryption key. Any of a variety of public and/or proprietary encryption algorithms can be used to decrypt the encryption key.

The authentication key to use to obtain the encryption key can be obtained by the trusted runtime in a variety of different manners. In one or more embodiments, the authentication key is provided by the storage device protection system 106 as part of the request in act 602. Alternatively, the authentication key can be provided by the storage device protection system 106, or alternatively another module or device, in other manners or at other times.

The obtained encryption key is provided to the inline cryptographic processor (act 606). Providing the obtained encryption key to the inline cryptographic processor provisions the inline cryptographic processor with the obtained encryption key, allowing the inline cryptographic processor to encrypt data written to the portion and decrypt data read from the portion based on the obtained encryption key. The manner in which the encryption key is used to encrypt and decrypt data varies based on the manner in which encryption and decryption is performed by the inline cryptographic processor.

An identifier of the obtained encryption key is returned to the requester (act 608). The identifier can take any of a variety of different forms, but allows different encryption keys (e.g., used for different portions) to be identified, as discussed above. It should be noted that this identifier of the encryption key merely allows the operating system to identify to the inline cryptographic processor which encryption key to use; the identifier does not provide or otherwise allow the operating system to obtain the encryption key.

After the portion is unlocked, the inline cryptographic processor is provisioned with the encryption key for the portion. Data can be encrypted and written to the portion, as well as read from the portion and decrypted. Although the inline cryptographic processor has an unprotected copy of the encryption key, no other device, module, or component external to the inline cryptographic processor and the trusted runtime have access to the encryption key. In one or more embodiments, the trusted runtime discards all unprotected copies of the encryption key once it has been provisioned in the inline cryptographic processor. Alternatively, the trusted runtime may maintain a copy of the encryption key for a particular amount of time.

Disabling Protection of a Portion

Disabling protection of a portion refers to disassociating the portion with particular authentication credentials, no longer restricting access to the portion to only authenticated entities. For example, a user can request to have protection of the portion disabled, and as a result have the portion disassociated with the authentication credentials of the user, allowing access to the data stored on the portion (and allowing new data to be stored on the portion) without regard for what (if any) authentication credentials of the user are provided.

Figure 7:
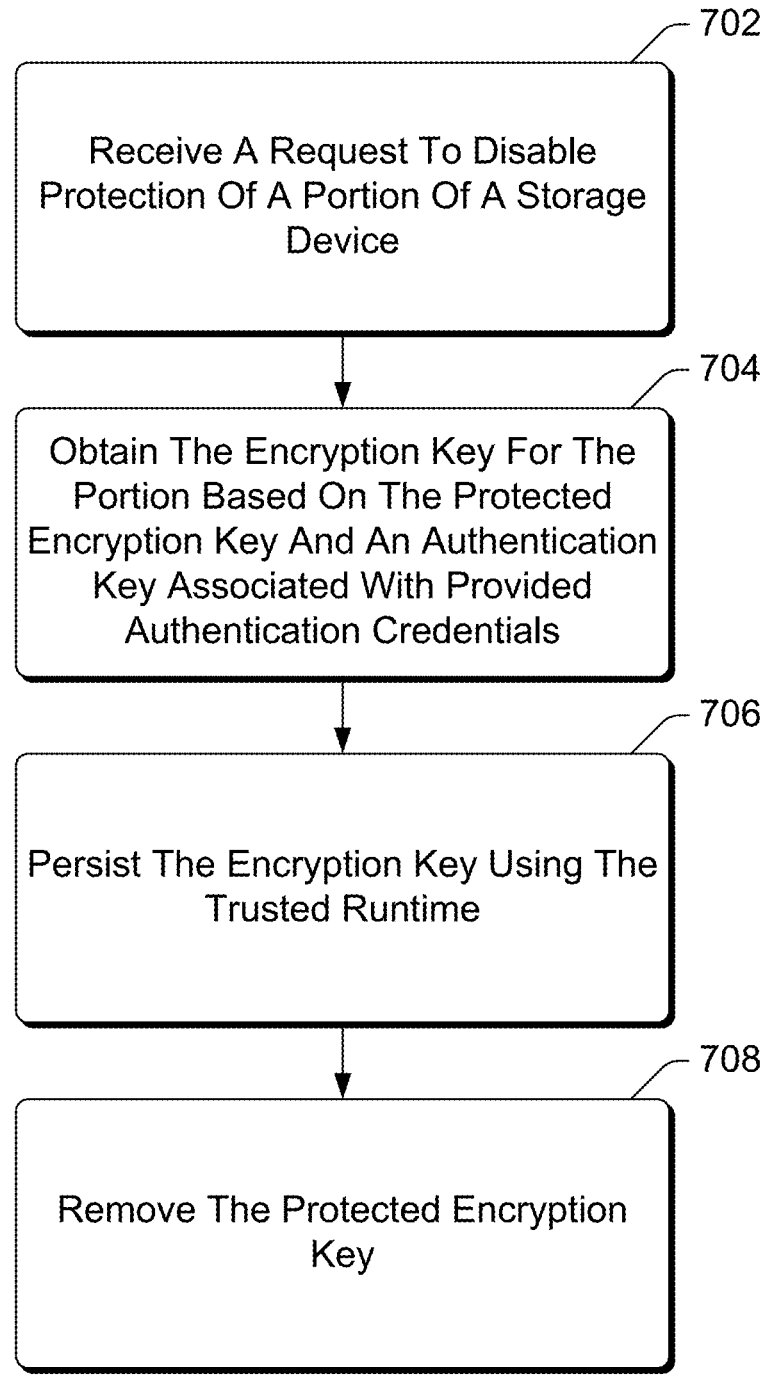
FIG. 7 is a flowchart illustrating an example process for disabling protection of a portion of a storage device in accordance with one or more embodiments.

FIG. 7 is a flowchart illustrating an example process 700 for disabling protection of a portion of a storage device in accordance with one or more embodiments. Process 700 is carried out by a trusted runtime of a computing device, such as trusted runtime 112 of FIGS. 1 and 2, and can be implemented in software, firmware, hardware, or combinations thereof. Process 700 is shown as a set of acts and is not limited to the order shown for performing the operations of the various acts. Process 700 is an example process for disabling protection of a portion of a storage device; additional discussions of disabling protection of a portion of a storage device are included herein with reference to different figures.

In process 700, a request to disable protection of a portion of a storage device is received (act 702). The request can be received in the form of a command, and can be received from various different modules. In one or more embodiments, the request is received from the storage device protection system 106 of FIG. 1 or FIG. 2, although the request can alternatively be received from other modules such as the operating system 108 of FIG. 1.

In response to the request, the encryption key for the portion is obtained from the protected encryption key for the portion (act 704). The encryption key for the portion is obtained based on both the protected encryption key and an authentication key. The protected encryption key for the portion is maintained in the persistent key store, or can be received from the operating system, as discussed above. The authentication key is the authentication key associated with user credentials provided to the storage device protection system 106. In one or more embodiments, the authentication key is the authentication key associated with an entity (e.g., a user) currently logged into a computing device implementing the system 200 of FIG. 2 at the time the request is received in act 402. Alternatively, the authentication key can be the authentication key associated with another entity providing user credentials to the computing device implementing the system 200 of FIG. 2.

The encryption key can be obtained from the protected encryption key in a variety of different manners, based at least in part on the manner in which the encryption key was previously protected. In one or more embodiments, a decryption algorithm uses the authentication key as the key to decrypt the encryption key. Any of a variety of public and/or proprietary encryption algorithms can be used to decrypt the encryption key.

The authentication key to use to obtain the encryption key can be obtained by the trusted runtime in a variety of different manners. In one or more embodiments, the authentication key is provided by the storage device protection system 106 as part of the request in act 702. Alternatively, the authentication key can be provided by the storage device protection system 106, or alternatively another module or device, in other manners or at other times.

Alternatively, in one or more embodiments the trusted runtime may choose to have a copy of the unprotected key in its memory while the portion is unlocked. In such embodiments, the trusted runtime need not decrypt the protected encryption key in order to obtain the unprotected encryption key in act 704.

The encryption key obtained in act 704 is persisted using the trusted runtime (act 706). The encryption key can be persisted in different manners, analogous to the discussion above regarding act 306 of FIG. 3. For example, the encryption key can be maintained in a persistent key store of the trusted runtime, or an encrypted encryption key can be generated (e.g., generated by encrypting the encryption key using a secret key known only to the trusted runtime) and the encrypted encryption key provided to the operating system. The encryption key is persisted across power cycles, as discussed above.

Additionally, the protected encryption key is removed (act 708). In situations in which the protected encryption key is maintained in the persistent key store, the obtained encryption key effectively replaces the protected encryption key in the persistent key store, for example overwriting the protected encryption key. Thus, the protected encryption key is removed from the persistent key store. Alternatively, in situations in which the protected encryption key is returned to and maintained by the operating system, the trusted runtime notifies the operating system to delete the protected encryption key. Thus, the protected encryption key is removed from the operating system.

After protection of the portion is disabled, access to the data stored in the portion is unrestricted. Although the data stored in the portion is encrypted, no authentication credentials need be provided to the trusted runtime in order to read the encrypted data. In one or more embodiments, the data in the portion is deleted or protected in some other manner prior to disabling protection of the portion.

As discussed above, even when protection of the portion is enabled and the portion is unlocked, the encryption key is not known to the operating system or the storage device protection system 106. Protection of the portion can thus be disabled, and the computing device transferred to a different user without a risk that the encryption keys in the trusted runtime or inline cryptographic processor are known to a previous user of the computing device or the storage device protection system used by the previous user of the computing device.

Portion Recovery and Migration

Maintaining the encryption key or the protected encryption key in the trusted runtime makes the encryption key, and thus the portion, inaccessible if the storage device is moved to a different computing device. Portion recovery and migration refers to allowing the trusted runtime to reveal a protected encryption key, or the unprotected encryption key, in order to allow recovery or migration of the portion. For example, a user can request to have the storage device including the portion migrated to a different computing device, and have the protected encryption key revealed in order to do so. By way of another example, a user can request to have the encryption key revealed to an administrator or other device for recovery purposes, in case the user loses his or her authentication credentials.

Figure 8:
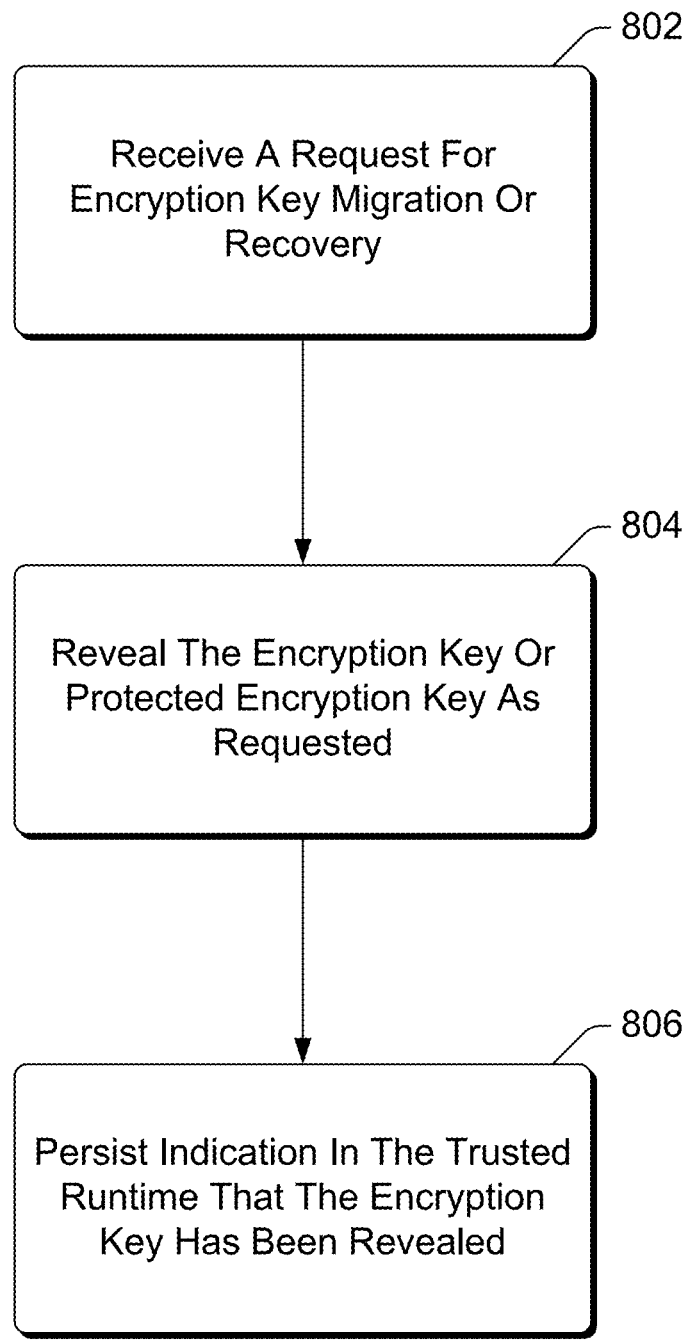
FIG. 8 is a flowchart illustrating an example process for revealing an encryption key for recovery or migration of a portion in accordance with one or more embodiments.

FIG. 8 is a flowchart illustrating an example process 800 for revealing an encryption key for recovery or migration of a portion in accordance with one or more embodiments. Process 800 is carried out by a trusted runtime of a computing device, such as trusted runtime 112 of FIGS. 1 and 2, and can be implemented in software, firmware, hardware, or combinations thereof. Process 800 is shown as a set of acts and is not limited to the order shown for performing the operations of the various acts. Process 800 is an example process for revealing an encryption key for recovery or migration of a portion; additional discussions of revealing an encryption key for recovery or migration of a portion are included herein with reference to different figures.

In process 800, a request for migration or recovery of an encryption key of a portion of a storage device is received (act 802). The request can be received in the form of a command, and can be received from various different modules. In one or more embodiments, the request is received from the storage device protection system 106 of FIG. 1 or FIG. 2, although the request can alternatively be received from other modules such as the operating system 108 of FIG. 1.

In response to the request, the encryption key or protected encryption key is revealed as requested (act 804). The trusted runtime can optionally take various authentication or approval actions to verify that it should indeed reveal the requested key. The unprotected copy of the key can be revealed, or alternatively a protected copy of the key can be revealed, depending on the request. Alternatively, a copy of the key protected using (e.g., encrypted based on) a secret key of the trusted runtime can be revealed. Other devices or components can store such a protected key, but only the trusted runtime has the secret key that can be used to obtain the encryption key from the protected encryption key. Alternatively, the trusted runtime can choose to reveal the secret key to another user or device (e.g., an administrator) if desired.

In one or more embodiments, the request 802 is received from a backup system, such as an administrator or other device on a network. The backup system provides an indication of a key (e.g., provides the key) that is to be used to encrypt the encryption key, and the encrypted encryption key is provided to the backup system. The user and operating system of the computing device need not have access to the key used to encrypt the encryption key.

Additionally, an indication that the encryption key has been revealed is persisted in the trusted runtime (act 806). The indication is persisted, for example, in the persistent key store along with the revealed key. The indication can optionally indicate how the key was revealed (e.g., whether the unprotected encryption key was revealed or the protected encryption key was revealed).

The operating system or storage device protection system 106 can retrieve this indication in act 806, and act as desired based on this indication. For example, a storage device protection system 106 may display a warning to a user of the computing device that the encryption key for the portion has been revealed, and receive the user's approval to proceed with using the portion before providing an authentication key to the trusted runtime.

Returning to FIG. 2, various operations regarding portions are discussed herein. It should be noted that these operations are examples, and that the system 200 may not support all of these operations. For example, the system 200 may not support portion recovery and migration. Additionally, it should be noted that the system 200 can support additional operations regarding portions. For example, the system 200 may support a key replacement operation that causes the trusted runtime to generate a new encryption key for a portion and replace the previous encryption key in the persistent key store with the newly generated encryption key, or replace the previous protected encryption key with a protected newly generated key. Although such key replacement would prevent any data previously written to the portion from being subsequently decrypted (because the encryption key used to decrypt such data has been deleted), such key replacement may allow continued use of the portion and peace of mind for the user if the previous encryption key had been revealed by the trusted runtime (e.g., due to a portion recovery and migration operation). Alternatively, such key replacement could allow for re-encryption of the portion with the newly generated key, preserving the data previously written to the portion (and data previously written to the portion to be decrypted if a backup system made the encryption key used to decrypt such previously written data available, or the encryption key was otherwise available).

It should also be noted that, although portions of the storage device 104 are discussed as having all the data written to the portion encrypted and read from the portion decrypted, in some situations such encryption and decryption need not be performed. In one or more embodiments, at least part of a portion can optionally include data that is not encrypted. Such parts may include metadata regarding the portion, such as an identifier of key protectors stored on the portion, how to access the portion, and so forth. Such data need not be encrypted or decrypted. Such data can be identified in different manners, such as the operating system providing an indication that no encryption key is to be used (e.g., providing an identifier associated with no encryption, such as a null identifier, or providing no identifier at all).

Additionally, situations can arise in which the operating system desires to read and write the data stored on a portion in its encrypted form. For example, an operating system may transfer encrypted data from one storage device to another, backup encrypted data, and so forth. The operating system can submit an I/O request indicating that no encryption key is to be used, so the inline cryptographic processor 114 provides the requested encrypted content to the operating system.

Thus, it should also be noted that some I/O requests to a portion can be supported even though the portion may be locked. For example, unencrypted data may still be read from the portion, or the encrypted data itself returned to the operating system in response to an I/O request, as no encryption key is used to decrypt such data.

The techniques discussed herein support various different usage scenarios. Data is encrypted on a portion of a storage device based on an encryption key generated by the trusted runtime and provided to the inline cryptographic processor. The encryption key can thus be generated in response to a user request at the computing device, and the user need not rely on a third party (e.g., a manufacturer of the computing device) provisioning the computing device with the encryption key. Furthermore, neither the trusted runtime nor the inline cryptographic processor need disclose the encryption key to other programs external to the trusted runtime and the inline cryptographic processor—no third party or other device need be provided with the encryption key.

Additionally, in response to a user request to have the portion encrypted or protected, an indication can be rapidly (immediately) returned that the data on the portion is encrypted or protected. The indication can be returned without waiting for data on the portion to be encrypted because any data written to the portion since its creation is already encrypted. Some parts of the portion may not be encrypted, but those parts are the parts of the portion to which no data has been written since the portion was created. The user thus need not wait an extended period of time (e.g., several minutes to many hours) for the data on the portion to be encrypted. Rather, the indication can be returned rapidly (e.g., within a threshold amount of time, such as 1-5 seconds), and can optionally be returned synchronously as part of a call made to have the portion encrypted or protected.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 9:
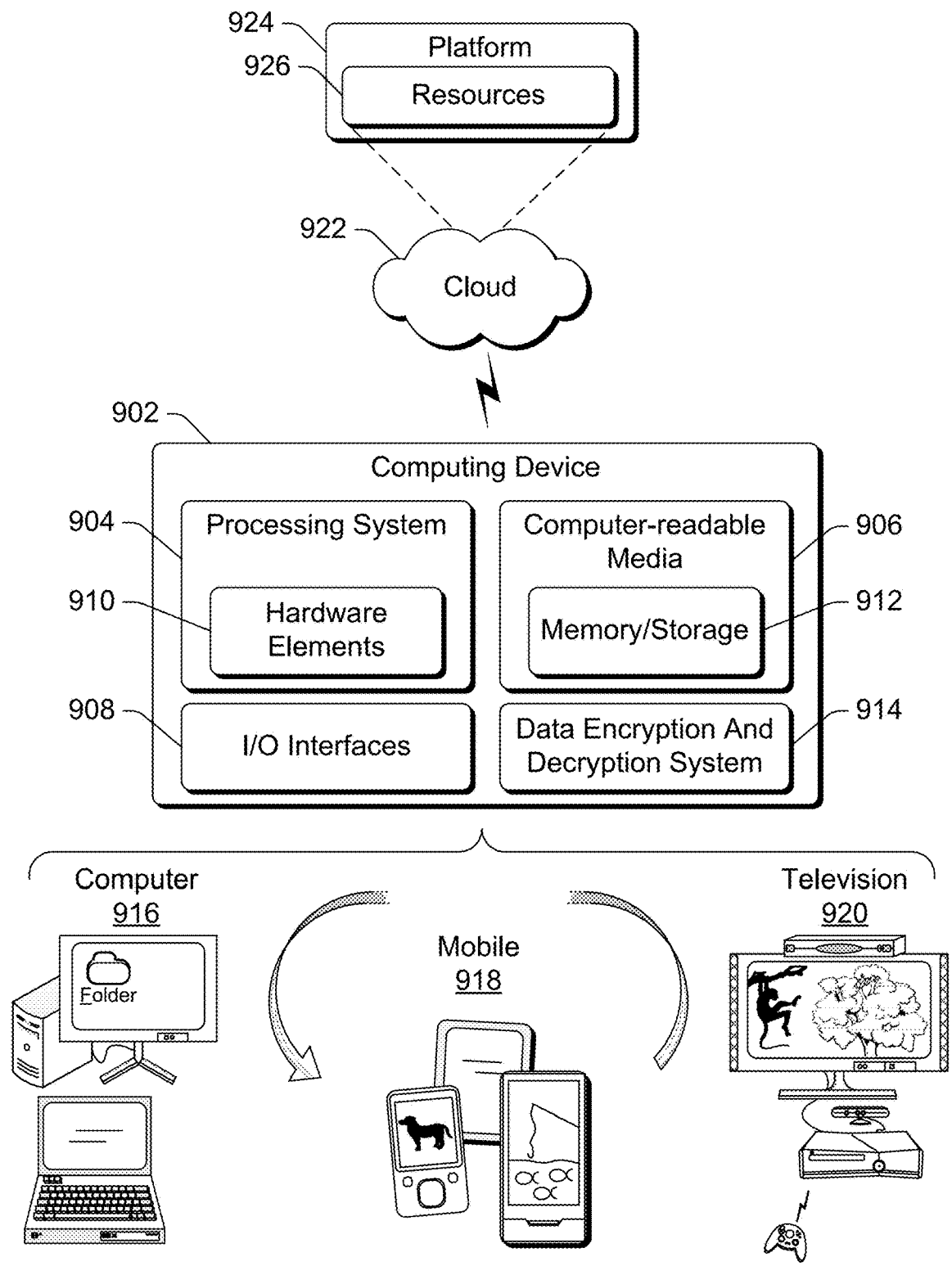
FIG. 9 illustrates an example system that is representative of one or more systems and/or devices that may implement the various techniques described herein.

FIG. 9 illustrates an example system generally at 900 that includes an example computing device 902 that is representative of one or more systems and/or devices that may implement the various techniques described herein. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O Interfaces 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 906 is illustrated as including memory/storage 912. The memory/storage 912 represents memory/storage capacity associated with one or more computer-readable media. The memory/storage 912 may include volatile media (such as random access memory (RAM)) and/or nonvolatile media (such as read only memory (ROM), Flash memory, optical disks, magnetic disks, and so forth). The memory/storage 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 902 may be configured in a variety of ways as further described below to support user interaction.

Computing device 902 also includes a data encryption and decryption system 914. Data encryption and decryption system 914 provides various data encryption and decryption support, including a trusted runtime and an inline cryptographic processor as discussed above. Data encryption and decryption system 914 can implement, for example, trusted runtime 112 and inline cryptographic processor 114 of FIGS. 1 and 2.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of modules as a module that is executable by the computing device 902 as software may be achieved at least partially in hardware, e.g., through use of computer-readable storage media and/or hardware elements 910 of the processing system. The instructions and/or functions may be executable/operable by one or more articles of manufacture (for example, one or more computing devices 902 and/or processing systems 904) to implement techniques, modules, and examples described herein.

As further illustrated in FIG. 9, the example system 900 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 900, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 902 may assume a variety of different configurations, such as for computer 916, mobile 918, and television 920 uses. Each of these configurations includes devices that may have generally different constructs and capabilities, and thus the computing device 902 may be configured according to one or more of the different device classes. For instance, the computing device 902 may be implemented as the computer 916 class of a device that includes a personal computer, desktop computer, a multi-screen computer, laptop computer, netbook, and so on.

The computing device 902 may also be implemented as the mobile 918 class of device that includes mobile devices, such as a mobile phone, portable music player, portable gaming device, a tablet computer, a multi-screen computer, a wearable device, an Internet of Things (IoT) device, and so on. The computing device 902 may also be implemented as the television 920 class of device that includes devices having or connected to generally larger screens in casual viewing environments. These devices include televisions, set-top boxes, gaming consoles, and so on.

The techniques described herein may be supported by these various configurations of the computing device 902 and are not limited to the specific examples of the techniques described herein. This functionality may also be implemented all or in part through use of a distributed system, such as over a "cloud" 922 via a platform 924 as described below.

The cloud 922 includes and/or is representative of a platform 924 for resources 926. The platform 924 abstracts underlying functionality of hardware (e.g., servers) and software resources of the cloud 922. The resources 926 may include applications and/or data that can be utilized while computer processing is executed on servers that are remote from the computing device 902. Resources 926 can also include services provided over the Internet and/or through a subscriber network, such as a cellular or Wi-Fi network.

The platform 924 may abstract resources and functions to connect the computing device 902 with other computing devices. The platform 924 may also serve to abstract scaling of resources to provide a corresponding level of scale to encountered demand for the resources 926 that are implemented via the platform 924. Accordingly, in an interconnected device embodiment, implementation of functionality described herein may be distributed throughout the system 900. For example, the functionality may be implemented in part on the computing device 902 as well as via the platform 924 that abstracts the functionality of the cloud 922.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a computing device having an inline cryptographic processor implemented at least in part in hardware, the method comprising:
   receiving, at a trusted runtime, a request to generate a key for a portion of a storage device, the request to generate the key being received as part of creation of the portion of the storage device, the trusted runtime being isolated from other programs in the computing device;
   in response to the request to generate the key, the trusted runtime:
      generating the key,
      persisting the key across power cycles of the computing device,
      provisioning the inline cryptographic processor of the computing device with the key to be stored in a register of the inline cryptographic processor, and
   the inline cryptographic processor subsequently encrypting writes to the portion of the storage device based on the key independent of a request to encrypt the portion of the storage device from a user, and subsequently decrypting reads from the portion of the storage device based on the key;
   the provisioning including:
      provisioning the inline cryptographic processor with the key without user authentication credentials being provided to the computing device until the request to encrypt the portion is received, and
      in response to the request to encrypt the portion, provisioning the inline cryptographic processor with the key only when the user authentication credentials are provided to the computing device; and
   returning, by the trusted runtime, in response to the request to encrypt the portion, an indication that data on the portion is encrypted without waiting for data on the portion to be encrypted because data previously written to the portion was already encrypted when the data was stored on the portion.

2. The method as recited in claim 1, the portion of the storage device comprising a newly defined partition of the storage device.

3. The method as recited in claim 1, further comprising the trusted runtime generating a protected key using a secret key known only to the trusted runtime by encrypting the key with the secret key.

4. The method as recited in claim 1, further comprising the trusted runtime, in response to the request to encrypt the portion:
   protecting the key based on an authentication key associated with authentication credentials provided to the computing device;
   ceasing having the key persisted across power cycles of the computing device; and having the protected key persisted across power cycles of the computing device.

5. The method as recited in claim 4, the protecting the key based on the authentication key comprising encrypting the key based on the authentication key.

6. The method as recited in claim 4, further comprising:
   receiving, after receiving the request to encrypt the portion, a request to lock the portion; and
   in response to the request to lock the portion, removing the key from both the trusted runtime and the inline cryptographic processor.

7. The method as recited in claim 6, further comprising:
   receiving, after removing the key from both the trusted runtime and the inline cryptographic processor, a request to unlock the portion; and in response to the request to unlock the portion:
    obtaining, based on the protected key, the key from the protected key, and
    provisioning the inline cryptographic processor of the computing device with the obtained key.

8. The method as recited in claim 4, further comprising:
receiving, after receiving the request to encrypt the portion, a request to disable protection of the portion; and
in response to the request to disable protection of the portion:
    obtaining, based on the protected key, the key from the protected key, and
    persisting the obtained key using the trusted runtime.

9. The method as recited in claim 4, further comprising:
receiving, after receiving the request to encrypt the portion, a request for migration or recovery of the key; and
in response to the request for migration or recovery of the key, revealing the protected key to a requester that issued the request for migration or recovery of the key.

10. The method as recited in claim 1, further comprising:
receiving a request for migration or recovery of the key; and
in response to the request for migration or recovery of the key, revealing the key to a requester that issued the request for migration or recovery of the key.

11. A computing device comprising:
a trusted runtime that is isolated from an operating system of the computing device and that is configured to:
    receive a request to generate a key for a portion of a storage device, the request to generate the key being received as part of creation of the portion,
    generate the key for the portion of the storage device,
    persist the key across power cycles of the computing device,
    provision an inline cryptographic processor of the computing device with the key to be stored in a register of the inline cryptographic processor, the inline cryptographic processor subsequently encrypting writes to the portion of the storage device based on the key independent of a request to encrypt the portion of the storage device from a user, and subsequently decrypting reads from the portion of the storage device based on the key, and
    return, in response to a request to encrypt the portion of the storage device, an indication that data on the portion of the storage device is encrypted without waiting for data on the portion to be encrypted because data previously written to the portion was already encrypted when the data was stored on the portion; and
the inline cryptographic processor configured to:
    receive the key from the trusted runtime to provide unrestricted access to data stored on the portion until the request is received, and in response to the request to provide access to the data stored on the portion only when user authentication credentials are provided to the computing device,
    encrypt, in response to receipt of the key, subsequent writes to the portion of the storage device based on the key, and
    decrypt, in response to receipt of the key, subsequent reads from the portion of the storage device based on the key.

12. The computing device as recited in claim 11, the portion of the storage device comprising a newly defined partition of the storage device.

13. The computing device as recited in claim 11, the trusted runtime being further configured to generate the key in response to a request to generate the key, and to generate a protected key using a secret key known only to the trusted runtime by encrypting the key with the secret key in response to the request to generate the key.

14. The computing device as recited in claim 11, the trusted runtime being further configured to, in response to the request that protection of the portion be enabled:
    protect the key based on an authentication key associated with authentication credentials provided to the computing device;
    cease having the key persisted across power cycles of the computing device; and have the protected key persisted across power cycles of the computing device.

15. The computing device as recited in claim 14, wherein to protect the key based on the authentication key is to encrypt the key based on the authentication key.

16. The computing device as recited in claim 14, the trusted runtime being further configured to: receive, after receiving the request that protection of the portion be enabled, a request to lock the portion; and in response to the request to lock the portion, remove the key from both the trusted runtime and the inline cryptographic processor.

17. The computing device as recited in claim 16, the trusted runtime being further configured to:
    receive, after removing the key from both the trusted runtime and the inline cryptographic processor, a request to unlock the portion; and
    in response to the request to unlock the portion:
        obtain, based on the protected key, the key from the protected key,
        provision the inline cryptographic processor of the computing device with the obtained key, and
        return an identifier of the obtained key to allow the operating system of the computing device to identify to the inline cryptographic processor to use the obtained key, the identifier of the obtained key not allowing the operating system to obtain the key.

18. The computing device as recited in claim 14, the trusted runtime being further configured to:
    receive, after receiving the request that protection of the portion be enabled, a request to disable protection of the portion; and
    in response to the request to disable protection of the portion:
        obtain, based on the protected key, the key from the protected key,
        persist the obtained key using the trusted runtime, and
        remove the protected key from the trusted runtime.

19. The computing device as recited in claim 14, further comprising a storage device protection system configured to manage authentication of credentials and to manage configuration of the trusted runtime based on the authenticated credentials,
    the trusted runtime being further configured to:
    receive, after receiving the request that protection of the portion be enabled, a request for migration or recovery of the key,
    in response to the request for migration or recovery of the key, reveal the protected key to a requester that issued the request for migration or recovery of the key, and
    persist an indication that the protected key has been revealed along with the protected key; and
    the storage device protection system being further configured to:

retrieve the indication that the protected key has been revealed from the trusted runtime, display a warning that the protected key for the portion has been revealed, and receive user approval to proceed with using the portion of the storage device before providing the authentication key to the trusted runtime, the authentication key associated with the user authentication credentials provided to the computing device.

20. A computing device comprising:

a trusted runtime that is isolated from an operating system of the computing device and that is configured to:

receive a request to generate a key for a portion of a storage device, the request to generate the key being received as part of creation of the portion, generate the key for the portion of the storage device, persist the key across power cycles of the computing device, provision an inline cryptographic processor of the computing device with the key to be stored in a register of the inline cryptographic processor, the inline cryptographic processor subsequently encrypting writes to the portion of the storage device based on the key independent of a request to encrypt the portion of the storage device from a user, and subsequently decrypting reads from the portion of the storage device based on the key, and return, in response to a request to encrypt the portion of the storage device, an indication that data on the portion of the storage device is encrypted without waiting for data on the portion to be encrypted because data previously written to the portion was already encrypted when the data was stored on the portion; and the inline cryptographic processor configured to:

receive the key from the trusted runtime to provide access to data stored on the portion without user authentication credentials being provided to the computing device until the request to encrypt the portion is received, and in response to the request to encrypt the portion to provide access to the data stored on the portion only when the user authentication credentials are provided to the computing device, protect the key based on a secret key by encrypting the key with the secret key known only to the inline cryptographic processor, return the protected key to the operating system of the computing device, the protected key allowing the operating system to identify to the inline cryptographic processor which key to use without allowing the operating system to obtain the key, encrypt, in response to receipt of the key, subsequent writes to the portion of the storage device based on the key, and decrypt, in response to receipt of the key, subsequent reads from the portion of the storage device based on the key without the user authentication credentials being provided to the computing device.

* * * * *